(12) United States Patent
Ito et al.

(10) Patent No.: US 7,194,140 B2
(45) Date of Patent: Mar. 20, 2007

(54) IMAGE PROCESSING APPARATUS AND METHOD WHICH COMPRESSES IMAGE DATA OF EACH REGION USING A SELECTED ENCODING METHOD

(75) Inventors: Naoki Ito, Tokyo (JP); Tadayoshi Nakayama, Tokyo (JP); Ken-ichi Ohta, Kanagawa (JP); Hidefumi Osawa, Saitama (JP); Shinichi Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 842 days.

(21) Appl. No.: 10/286,776

(22) Filed: Nov. 4, 2002

(65) Prior Publication Data
US 2003/0086127 A1 May 8, 2003

(30) Foreign Application Priority Data

Nov. 5, 2001 (JP) ............................. 2001-339863
Jan. 10, 2002 (JP) ............................. 2002-003893

(51) Int. Cl.
G06K 9/36 (2006.01)
G06K 1/00 (2006.01)

(52) U.S. Cl. ...................... 382/251; 382/239; 358/1.16
(58) Field of Classification Search ..................... None
See application file for complete search history.

(56) References Cited

U.S. PATENT DOCUMENTS 5,402,248 A  3/1995  Sato et al. .................. 358/426
5,732,157 A  3/1998  Osawa ........................ 382/244
5,812,146 A  9/1998  Sato et al. ................... 345/501
5,818,970 A  10/1998 Ishikawa et al. ............. 382/248
5,832,126 A * 11/1998 Tanaka ........................ 382/239
5,861,892 A  1/1999  Sato et al. ................... 345/435
5,883,973 A * 3/1999  Pascovici et al. ............ 382/176
5,986,594 A  11/1999 Nakayama et al. ......... 341/107
6,167,160 A  12/2000 Osawa ........................ 382/247

FOREIGN PATENT DOCUMENTS

JP           07030732 A  *  1/1995
JP           11-203071       7/1999

* cited by examiner

Primary Examiner—Wenpeng Chen
(74) Attorney, Agent, or Firm—Fitzpatrick, Cella, Harper & Scinto

(57) ABSTRACT

This invention has as its object to provide an image processing apparatus, which can obviate the need for image re-input, can effectively generate encoded data that falls within a set size, and can minimize deterioration of image quality. To this end, an image processing apparatus according to this invention includes first discrimination unit for discriminating the type of image of each of a plurality of regions, which form image data input, second discrimination unit for discriminating if the image data is inputted by a continuous scan of images, selection unit for selecting an encoding method used in compression of each region on the basis of discrimination results of the first and second discrimination unit, first compression unit for compressing image data of each region using the encoding method selected by the selection unit, and second compression unit for compressing information that pertains to the type of image of each region.

23 Claims, 36 Drawing Sheets

PHOTO REGION QUANTIZATION MATRIX $$T1 = \begin{pmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 49 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 191 \\ 72 & 92 & 95 & 98 & 112 & 100 & 103 & 99 \end{pmatrix}$$

FIG. 33B

TEXT REGION QUANTIZATION MATRIX $$T2 = \begin{pmatrix} 16 & 14 & 12 & 16 & 16 & 24 & 40 & 50 \\ 14 & 14 & 16 & 19 & 20 & 26 & 50 & 60 \\ 16 & 14 & 18 & 24 & 40 & 50 & 60 & 50 \\ 16 & 18 & 22 & 29 & 40 & 60 & 60 & 50 \\ 16 & 20 & 32 & 48 & 68 & 109 & 103 & 92 \\ 20 & 30 & 45 & 60 & 81 & 104 & 113 & 92 \\ 42 & 56 & 68 & 78 & 103 & 121 & 120 & 101 \\ 64 & 80 & 88 & 90 & 112 & 100 & 103 & 99 \end{pmatrix}$$

IMAGE PROCESSING APPARATUS AND METHOD WHICH COMPRESSES IMAGE DATA OF EACH REGION USING A SELECTED ENCODING METHOD

FIELD OF THE INVENTION

The present invention relates to an image processing apparatus and method for compression-encoding image data, a computer program, and a computer readable storage medium.

BACKGROUND OF THE INVENTION

As a conventional color still image compression method, a JPEG method that exploits discrete cosine transformation and a method that exploits Wavelet transformation are prevalently used. A coding method of this type implements encoding and decoding of image data by uniformly applying a predetermined compression coding process to the entire image (i.e., by defining one single quantization matrix) independently of the type or read method of image to be encoded.

In general, a natural image such as a photo or the like suffers relatively slight deterioration of image quality even when such image has undergone a compression coding process. However, a non-natural image such as text, computer graphics, thin line, print halftone dot screen, or the like suffers tremendous deterioration of image quality when such image has undergone a compression coding process.

Upon executing a compression coding process of a mixed image that includes both a natural image such as a photo or the like, and a non-natural image such as text or the like, if the entire image is uniformly encoded in correspondence with an image portion that may suffer tremendous deterioration of image quality, a sufficiently high compression ratio cannot be obtained. On the other hand, if the entire image is uniformly encoded by increasing the compression ratio, a portion that suffers tremendous deterioration of image quality is formed.

In order to implement a compression coding process with high compression efficiency while suppressing deterioration of image quality, various setups for a compression coding process are optimized by executing a prescan. More specifically, a method of re-reading a document image by changing the compression ratio when a scheduled encoded data size has been exceeded, a method of re-setting quantization parameters to adjust an encoded data size by estimating the encoded data size by a prescan, and the like are adopted.

As an encoded data size control scheme that makes a prescan, for example, a method of storing pre-compressed data in an internal buffer memory, expanding that data, changing the compression ratio, actually compressing the expanded data, and outputting the compressed data to an external memory is known. In the actual compression process in this case, a higher compression ratio than that in pre-compression is set.

For example, a method of obtaining allowable encoded data sizes for respective pixel blocks, and Huffman-encoding coefficients obtained by level-shifting DCT coefficients n times so as to reduce the total encoded data size is known. In this method, this shift amount n is determined based on each allowable encoded data size.

However, in order to implement the compression coding process with high compression efficiency while suppressing deterioration of image quality, if a prescan is made, various problems are posed.

First, in case of a method of implementing an optimal compression coding process by making a prescan, a compression buffer must have a size larger than a target compressed data size, and requires a size that can record image data of a document image so as to prevent an intermediate buffer from overflowing.

Second, upon reading an image to be encoded using an image input apparatus such as an image scanner or the like, if a continuous scan mode is selected as the read method, since processes for decoding and re-compressing all compressed data must be inserted in the aforementioned method of repeating a compression coding process by a prescan, the continuous processing speed cannot be increased.

For these reasons, upon optimizing various setups for the compression coding process with a high compression ratio while suppressing deterioration of an image, a flexible coding process that can avoid a re-scan (image re-input) when possible is demanded.

SUMMARY OF THE INVENTION

The present invention has been made in consideration of the above problems, and has as its object to provide an image processing apparatus and method, which can obviate the need for image re-input, can effectively generate encoded data that falls within a set size, and can minimize deterioration of image quality with respect to a compression ratio, a computer program, and a computer readable storage medium.

In order to achieve the above object, for example, an image processing apparatus of the present invention comprises the following arrangement. That is, there is provided an image processing apparatus comprising:

input means for inputting image data;

first discrimination means for discriminating a type of image of each of a plurality of regions, which form image data input by the input means;

second discrimination means for discriminating if the image data is input by a continuous scan of images;

selection means for selecting an encoding method used in compression of each region on the basis of discrimination results of the first and second discrimination means;

first compression means for compressing image data of each region using the encoding method selected by the selection means; and second compression means for compressing information that pertains to the type of image of each region.

Also, an image processing apparatus of the present invention comprises the following arrangement. That is, there is provided an image processing apparatus for decoding encoded data obtained by encoding a plurality of regions that form image data as units to obtain the image data, comprising:

first decoding means for decoding the encoded data to obtain information that pertains to a type of image of a region to be decoded;

first discrimination means for discriminating a type of image of each region on the basis of the information decoded by the first decoding means;

second discrimination means for discriminating if the image data is input by a continuous scan of images;

selection means for selecting a decoding means used to decode the region on the basis of discrimination results of the first and second discrimination means; and second decoding means for decoding the region using the decoding method selected by the selection means.

Furthermore, an image processing apparatus of the present invention comprises the following arrangement. That is, there is provided an image processing apparatus for compression-encoding image data, comprising:

storage means for storing compression-encoded data;

discrimination means for discriminating image region information of input image data;

first compression encoding means for compression-encoding image data on the basis of a parameter that pertains to a quantization step, and a discrimination result of the discrimination means;

second compression encoding means for compression-encoding image data on the basis of a parameter that pertains to a quantization step, and the discrimination result of the discrimination means, decoding the encoded data compressed by the compression encoding means, and re-compressing the decoded data;

code size monitor means for monitoring a code size generated by the first compression encoding means, and checking if the code size reaches a predetermined size;

parameter setting means for, when the code size monitor means determines that the code size has reached the predetermined size, setting parameters to increase quantization steps in the first and second compression encoding means; and control means for, when the parameter setting means has changed the parameters, controlling the second compression encoding means to re-encode the encoded data previously generated by the first compression encoding means, storing the re-encoded data in the storage means as encoded data after the parameter of the first compression encoding means has been changed, and saving encoded data generated by the first compression encoding means after the parameter has been changed in the storage means as subsequent encoded data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4B shows text attribute flag data in a region which is determined to be a text region as a result of an image region separation process by the image processing apparatus according to the first embodiment of the present invention;

FIGS. 33A and 33B show an example of a quantization matrices adopted in an embodiment.

DETAILED DESCRIPTION OF THE PREFERRED EMBODIMENTS

Preferred embodiments of the present invention will now be described in detail in accordance with the accompanying drawings.

<First Embodiment>

Figure 14:
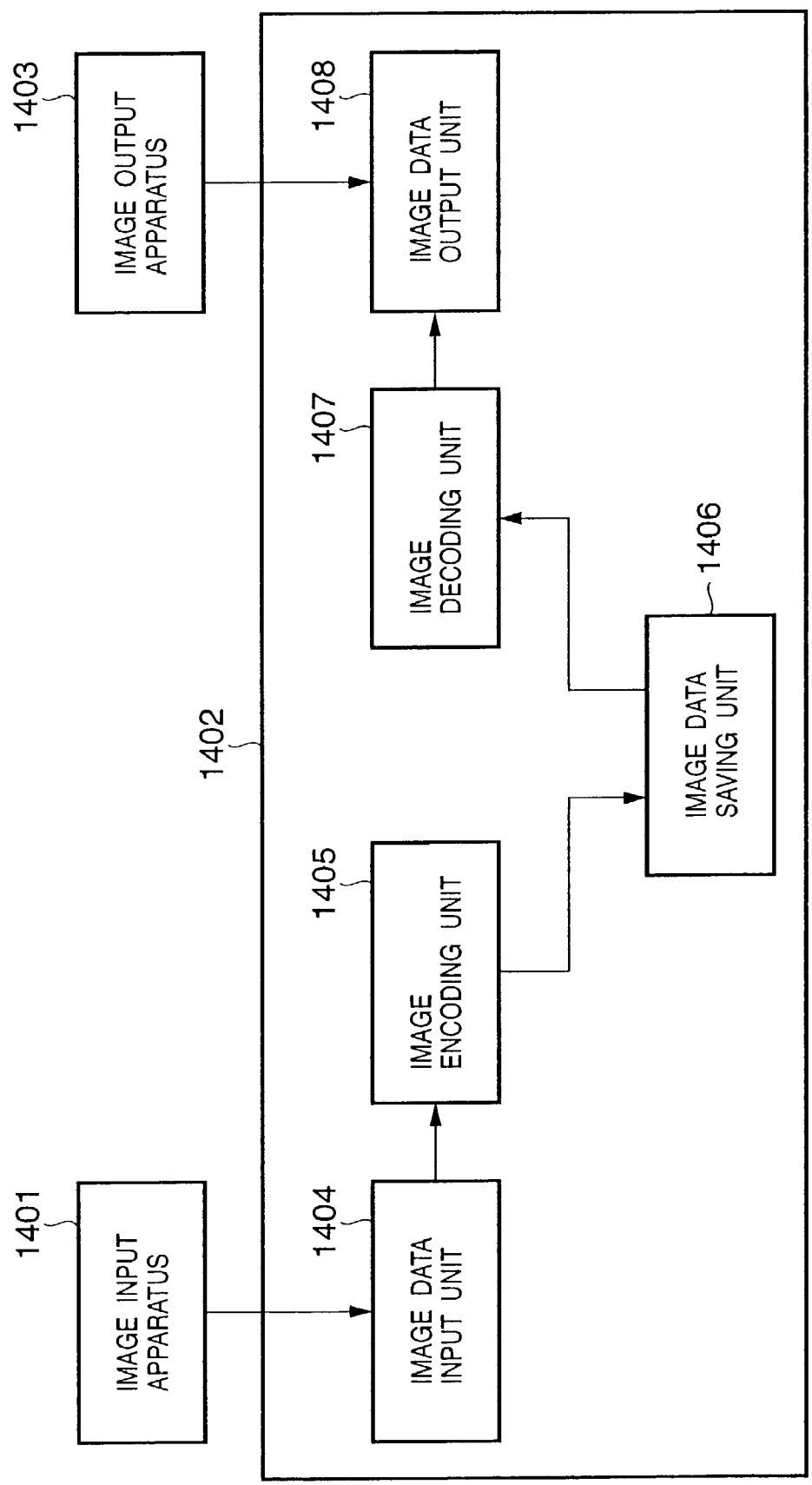
FIG. 14 is a block diagram showing the overall arrangement of an image processing system according to the first embodiment of the present invention.

The arrangement and operation summary of the entire image processing system which comprises an image processing apparatus according to the first embodiment of the present invention will be described below using FIG. 14.

1. Overall Arrangement of Image Processing System and Operation Summary of Image Processing Apparatus FIG. 14 shows the overall arrangement of an image processing system which comprises an image processing apparatus according to the first embodiment of the present invention. Reference numeral 1401 denotes an image input apparatus; 1402, an image processing apparatus; and 1403, an image output apparatus. The image processing apparatus 1402 further comprises an image data input unit 1404, image encoding unit 1405, image data saving unit 1406, image decoding unit 1407, and image output unit 1408.

Image data generated by a document reader as an image input apparatus (single scan; details will be explained later) or a document reader with an automatic document feeder (continuous scan; details will be explained later) is input to the image encoding unit 1405 via the image data input unit 1404. The image encoding unit 1405 segments the image data into a plurality of tiles (regions), and checks if each tile has a text or photo attribute. One of the first encoding method used for a tile with a text attribute and the second encoding method used for a tile with a photo attribute is selected on the basis of the aforementioned checking result, and identification information (not shown) about a scan method which indicates whether the image input apparatus makes a single or continuous scan. Respective tiles are compressed in turn by the selected encoding method, and information indicating the encoding method used is compressed for each tile. In the structure of the encoded image data, information indicating the encoding method is allocated in a header field, encoded image data obtained by compressing respective tiles follow, and such data structure is stored in the image data saving unit 1406.

On the other hand, compressed data stored in the image data saving unit 1406 is sent to the image decoding unit 1407 as needed. The image decoding unit 1407 decodes the compressed data on the basis of information indicating the encoding method stored in the header field, and outputs the decoded data to the image output apparatus 1403 via the image data output unit 1408.

The building apparatuses of the image processing system which comprises the image processing apparatus according to this embodiment, and their functions will be described in detail below.

2. Image Input Apparatus

The image input apparatus 1401 provides image data to the image processing apparatus 1402, and may be an external apparatus that can load recording media (CD, FD, MO, and the like) which record image data, a communication apparatus that can receive image data via a network, and the like in addition to the document reader (image scanner). As the data format of image data to be provided, so-called bitmap image data, image data described in a page description language (PDL), and the like may be used.

This embodiment will explain a case wherein the document reader is used as the image input apparatus 1401. Since single- and continuous-scan apparatuses are available as the document reader, and processes in the image processing apparatus 1402 (to be described later) differ depending on the types of document readers, the apparatus arrangements of both the types will be explained below.

(1) Single-scan Document Reader

Figure 11:
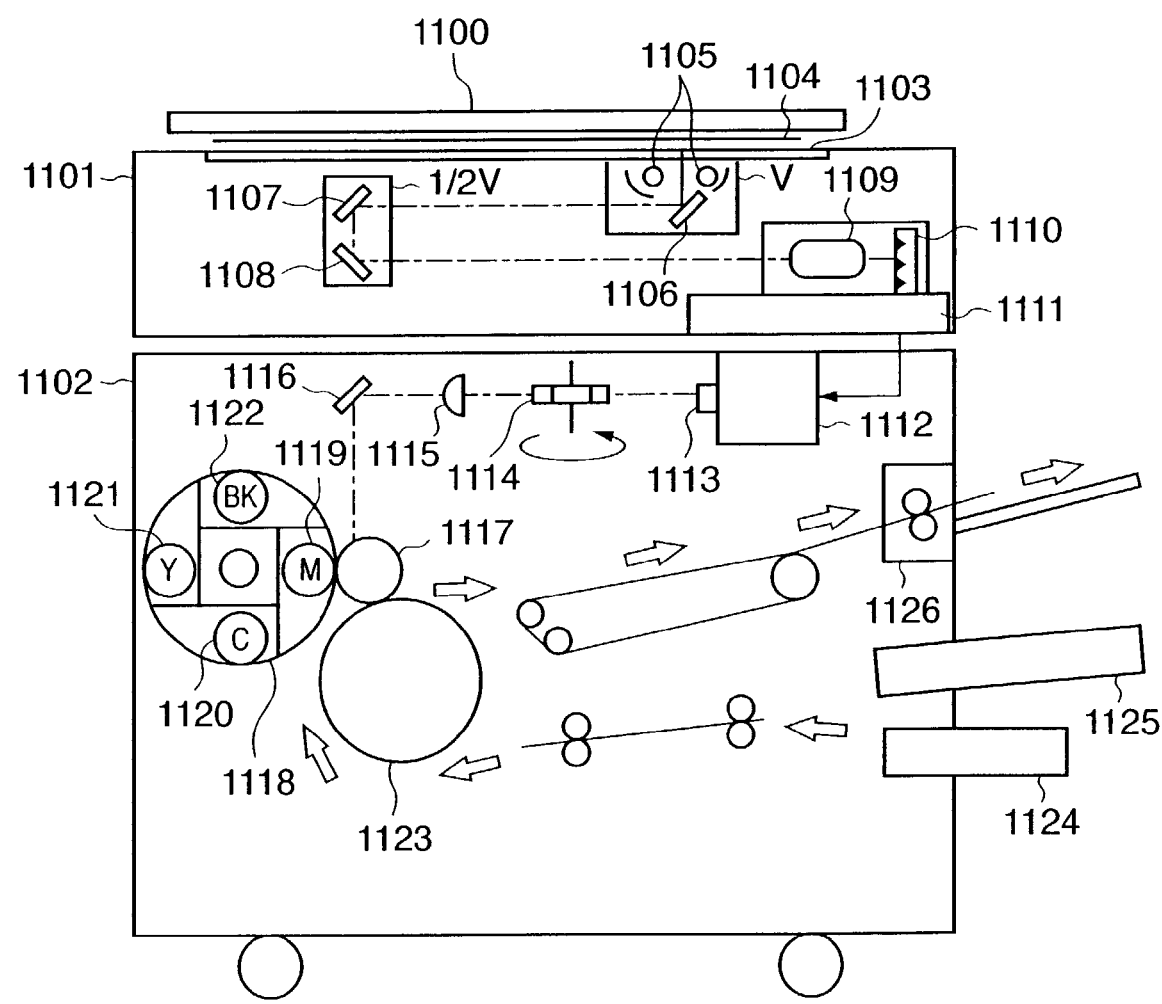
FIG. 11 is a side sectional view showing the arrangement of an image input apparatus according to the first embodiment of the present invention.

FIG. 11 shows an example of a multifunction digital image input/output apparatus (to be referred to as an MFP hereinafter) as the single-scan document reader, and is a side sectional view showing the arrangement of a color machine.

Referring to FIG. 11, an MFP 1100 is roughly divided into an image reader 1101 (image input unit) that reads a document image, and a printer 1102 (image output unit) that reproduces image data read by the image reader 1101. FIG. 11 shows the arrangement which does not comprise any automatic document feeder (i.e., a single-scan arrangement). The automatic document feeder will be described later with reference to FIG. 12.

The image reader 1101 reads a document image at a resolution of 400 dpi (dots/inch), and executes a digital signal process. The printer 1102 prints out a full-color image corresponding to the document image read by the image reader 1101 on a designated paper sheet.

In the image reader 1101, a document 1104 on a document table glass 1103 is irradiated with light emitted by a lamp 1105. Light reflected by the document 1104 is guided by mirrors 1106, 1107, and 1108, is focused by a lens 1109, and forms an image on a 3-line sensor (to be referred to as a CCD hereinafter) 1110 that converts the optical image into electrical signals. The electrical signals from the CCD 1110 are sent as red (R), green (G), and blue (B) components of full-color information (i.e., image signals) to a signal processor 1111. Note that a carriage, which fixes the lamp 1105 and mirror 1106, and the mirrors 1107 and 1108 respectively mechanically move at velocities v and 1/2v in a direction perpendicular to an electrical scan (main scan) direction of the line sensor, thus scanning the entire surface of the document (sub-scan).

The signal processor 1111 electrically processes the image signals sent from the CCD 1110, applies image processes (to be described later using FIG. 1) to these signals, and decomposes the image signals into magenta (M), cyan (C), yellow (Y), and black (Bk) components.

The image signals which are decomposed into M, C, Y, and Bk components in the signal processor 1111 can be externally output as image data. Also, the image signals can be printed. For reference, a sequence until a printed sheet is exhausted will be explained below. That is, the image signals decomposed by the signal processor 1111 are sent to a laser driver 1112. The laser driver 1112 modulates and drives a semiconductor laser 1113 in accordance with the received image signals. A laser beam emitted by the semiconductor laser 1113 scans the surface of a photosensitive drum 1117 via a polygonal mirror 1114, f-θ lens 1115, and mirror 1116.

Reference numeral 1118 denotes a rotary developer which includes a magenta developing unit 1119, cyan developing unit 1120, yellow developing unit 1121, and black developing unit 1122. These four developing units alternately contact the photosensitive drum 1117 to develop a latent image formed on the photosensitive drum with toner. Reference numeral 1123 denotes a transfer drum. A paper sheet fed from a paper cassette 1124 or 1125 is wound around this transfer drum 1112, and toner images on the photosensitive drum are transferred onto the paper sheet.

In this manner, after four, M, C, Y, and Bk color images are transferred in turn, the paper sheet passes through a fixing unit 1126, and is exhausted after the toner images are fixed on the paper sheet.

Figure 12:
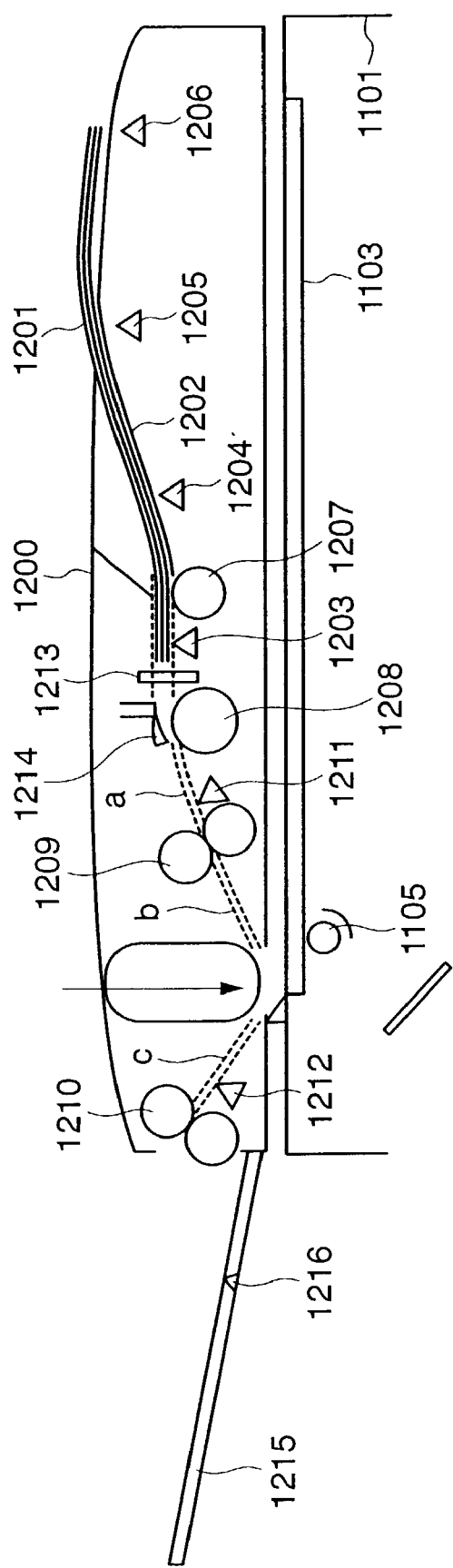
FIG. 12 is a side sectional view showing the arrangement of an automatic document feeder according to the first embodiment of the present invention.

(2) Continuous-scan Document Reader (a) Arrangement of Automatic Document Feeder FIG. 12 is a sectional view showing an automatic document feeder which allows a continuous scan when it is used together with the multifunction digital image input apparatus (MFP) as the document reader.

An automatic document feeder (ADF) is set on the image reader 1101 of the MFP 1100. Upon completion of a document on the document table glass 1103, the ADF sets the next document on the document table glass 1103, moves the read document from the document table glass 1103, and exhausts that document by an exhaust drive system when the read document reaches an exhaust unit. In this manner, the ADF can attain so-called "sheetfed scan" (continuous scan) that can continuously read a plurality of documents.

An ADF 1200 comprises a document table 1202 on which a bundle of documents 1201 are set. In FIG. 12, 1101 indicates the image reader unit in the MFP 1100, and 1103 and 1105 also indicate the document table glass and lamp in the image reader 1101 of the MFP 1100.

Some components of feed means are arranged near the document table 1202, and a document sensor 1203, and first, second, and third document size sensors 1204, 1205, and 1206 are arranged in the longitudinal direction of a document to be conveyed.

The feed means comprises a convey roller 1207, a separation roller 1208, a separation/convey motor (not shown), registration rollers 1209, exhaust rollers 1210, a registration sensor 1211, an exhaust sensor 1212, a shutter 1213, and a weight 1214. By pulling a shutter solenoid (not shown), the shutter 1213 moves upward, and the weight 1214 moves downward. The convey roller 1207 and separation roller 1208 are rotated in a normal direction by the separation/convey motor (not shown) to separate a document one by one in turn from the lowermost one of the bundle of documents 1201 on the document table 1202.

A document which has been separated from the bundle of documents 1201 and is located on sheet bus a is conveyed to sheet bus b by the registration rollers 1209, and passes by an exposure/read position. At the exposure/read position, a document is read while being conveyed. After the document has passed by the exposure/read position, it is conveyed along sheet bus c, and is exhausted onto an exhaust tray 1215 by the exhaust rollers 1210. Reference numeral 1216 denotes a sheet sensor, which detects the presence/absence of documents on the exhaust tray 1215.

(b) Operation Sequence of Automatic Document Feeder

Figure 13:
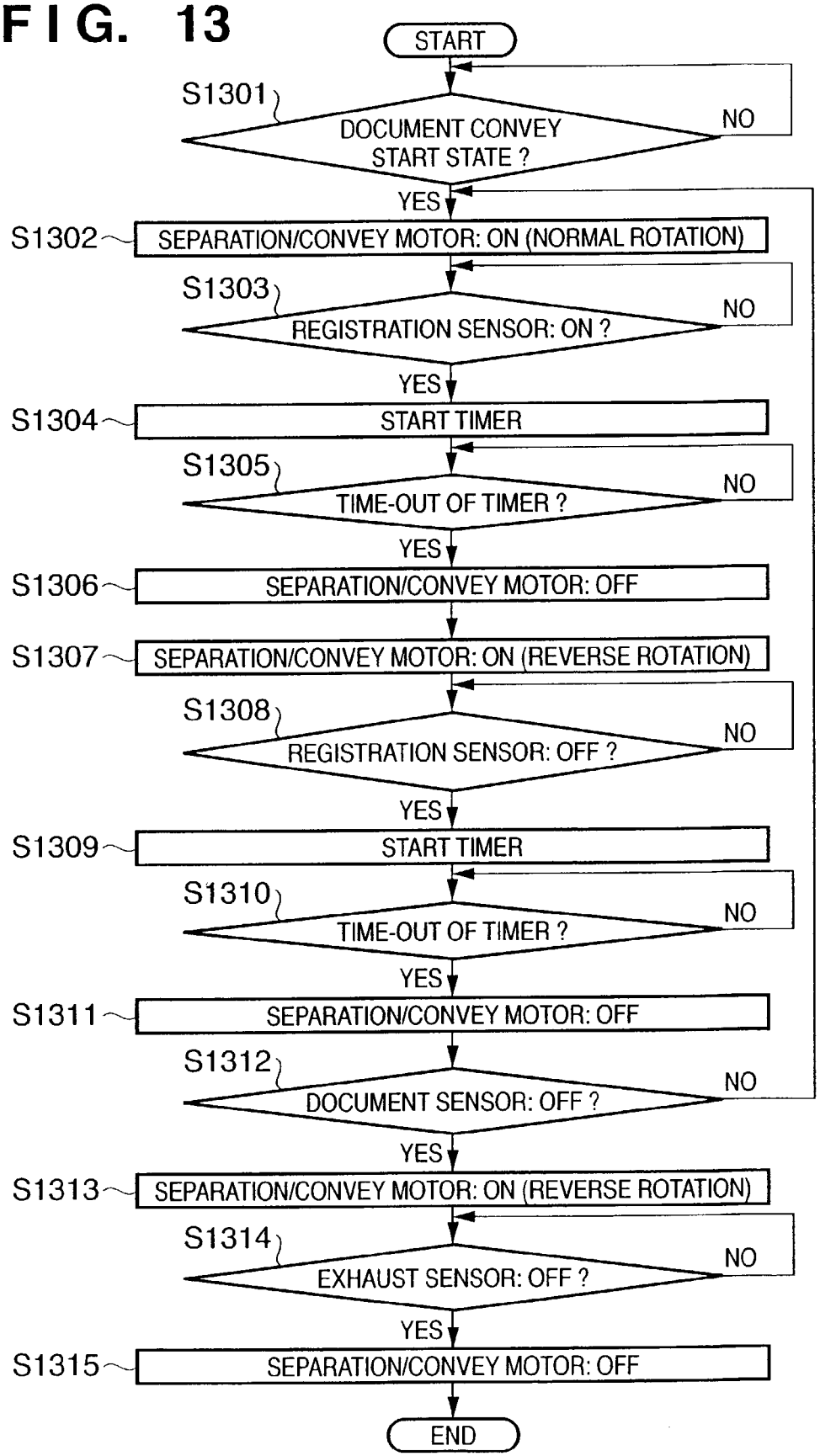
FIG. 13 is a flow chart showing the operation sequence of the automatic document feeder according to the first embodiment of the present invention.

FIG. 13 is a flow chart showing the operation sequence of the ADF 1200.

It is checked in step S1301 if the ADF is in a document convey start state. Whether or not the ADF is in the document convey start state is determined to see if a document convey start signal that indicates that the first one of the bundle of documents 1201 is fed is received from the MFP 1100.

If it is determined in step S1301 that the ADF is in the document convey start state, the document separation operation is started in step S1302. More specifically, the shutter 1213 (FIG. 12) moves upward, the weight 1214 moves downward, and the separation/convey motor rotates in a normal direction (step S1302), thus driving the convey roller 1207 and separation roller 1208. At this time, the registration rollers 1209 and exhaust rollers 1210 are not driven. It is then checked based on a signal from the registration sensor 1211 if the registration sensor 1211 detects the leading end of the separated document (step S1303). If the leading end of the separated document is detected, a timer is started in step S1304. The timer is used to stop the drive operation of the separation/convey timer, and is set to reach a time-out at a timing at which the document abuts against the registration rollers 1209. In this manner, any skew of the document can be removed.

It is monitored in step S1305 if the timer that has been started in step S1304 has reached a time-out. If YES in step S1305, the separation/convey motor is stopped, thus ending the separation operation (step S1306).

The rotational direction of the separation/convey motor is reversed to release the drive operation of the convey roller 1207 and separation roller 1208, and to drive the registration rollers 1209 and exhaust rollers 1210, thus beginning to convey the document which has abutted against the registration rollers 1209 (step S1307). The document undergoes a read operation while being conveyed on an optical system fixed position of the main body, and it is checked based on a signal from the registration sensor 1211 if the registration sensor 1211 detects the trailing end of the document (step S1308). If YES in step S1308, a timer is started to stop the motor when the trailing end of the document has passed by the read position (step S1309) If the timer has reached a time-out (step S1310), the separation/convey motor is stopped (step S1311), thus ending the read operation.

It is then checked based on a signal from the document sensor 1203 if the next document is present (step S1312). If it is determined that the next document is present, the flow returns to step S1302, and the same process is executed for the next document to be read until step S1306. Since the registration rollers 1209 and exhaust rollers 1210 are not driven during this interval, the read document is held in a state wherein its trailing end is located at the read position.

After the flow advances to step S1307 and the process is executed up to step S1311, the separation/convey motor is rotated in the reverse direction to drive the registration rollers 1209 and exhaust rollers 1210, thereby reading the next document, and exhausting the read document onto the exhaust tray 1215 at the same time. If the document sensor 1203 determines in step S1312 that the next document is not present, it is determined that the read document is the last one of the bundle of documents 1201. Hence, the flow advances to step S1313 without executing the separation operation of the next document, and the separation/convey motor is rotated in the reverse direction to drive the exhaust rollers 1210, thus starting the exhaust operation of the last document.

At the beginning of the operation, since a document is nipped by the exhaust rollers 1210 structurally, the exhaust sensor 1212 arranged near the exhaust rollers 1210 detects the document. Hence, it is checked in step S1314 if the exhaust sensor 1212 detects the trailing end of the document. If the exhaust sensor 1212 detects the trailing end, the motor is driven until the trailing end of the document leaves the exhaust rollers 1210, thus stopping the separation/convey motor (step S1315).

With the above arrangement and operation sequence, documents are successively fed, and undergo continuous scans by the MFP.

3. Image Processing Apparatus

The image processing apparatus according to the first embodiment of the present invention will be described below.

Figure 1:
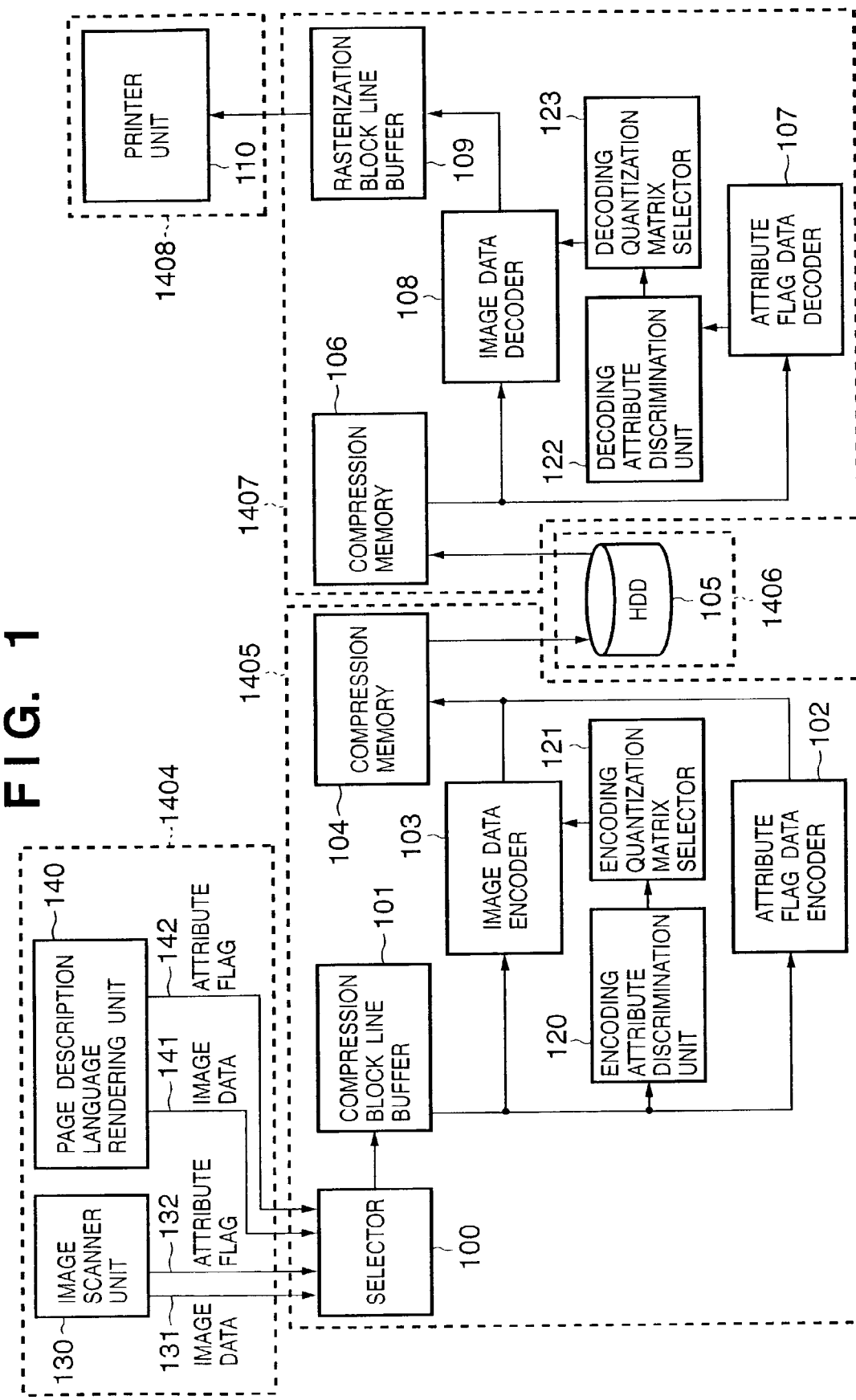
FIG. 1 is a block diagram showing an example of functional blocks of an image processing apparatus according to the first embodiment of the present invention.

FIG. 1 is a block diagram showing an example of functional blocks of the image processing apparatus according to the first embodiment of the present invention. As described above, the image processing apparatus can be roughly classified into the image data input unit 1404, image encoding unit 1405, image data saving unit 1406, image decoding unit 1407, and image data output unit 1408, which respectively comprise functions illustrated by blocks.

(1) Image Data Input Unit 1404

The image data input unit 1404 comprises an image scanner unit 130 and a page description language rendering unit 140, and is compatible to different data formats of image data from the image input apparatus 1401. Both the image scanner unit 130 and page description language rendering unit 140 output image data and attribute flag data to the image encoding unit 1405 on the basis of input image data.

The image scanner unit 130 executes a process when data from the image input apparatus 1401 is bitmap image data or the like, and generates attribute flag data by executing an image region separation process of the input image data.

Note that the image region separation process checks if each read pixel has a text or photo attribute. For example, if a pixel which forms a black character portion in a document image is found, "1" is output as the attribute flag of this pixel; if the pixel does not form a black character portion, "0" is output. The image region separation process will be described in more detail below using FIGS. 4A to 4D and FIGS. 5A and 5B.

Figure 4A:
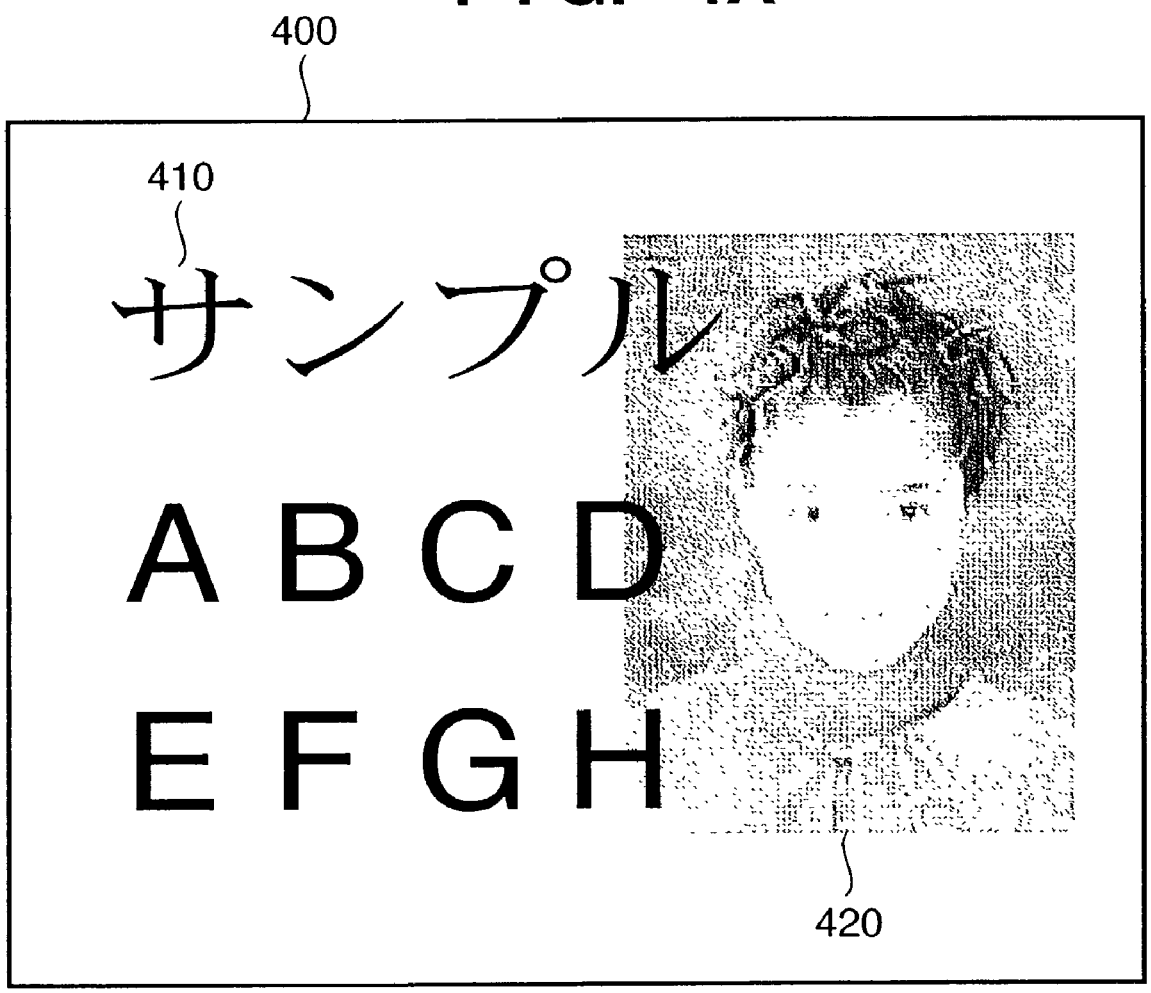
FIG. 4A shows an example of a document image which includes both a photo region and text region.

FIG. 4A shows an example of a document image which includes both a photo region and text region, as will be explained later, i.e., shows the configuration of the entire page. As shown in FIG. 4A, one page 400 includes both a text region 410 and a halftone dot printed photo region (to be referred to as a photo region hereinafter) 420.

The image scanner unit 130 makes the image input apparatus 1401 scan this document image using the color CCD sensor so as to read that image as color digital signals (R, G, B) for respective pixels. The read R, G, and B signals have features determined by attributes of respective regions of the image. Graphs 500 in FIGS. 5A and 5B indicate examples of G signals of the signal values (R, G, and B) read by the CCD sensor in respective regions, which are plotted in the CCD arrangement direction. The abscissa plots the CCD pixel position, the ordinate plots the signal value, and the upper and lower portions of the ordinate respectively indicate white and black.

Figure 5A:
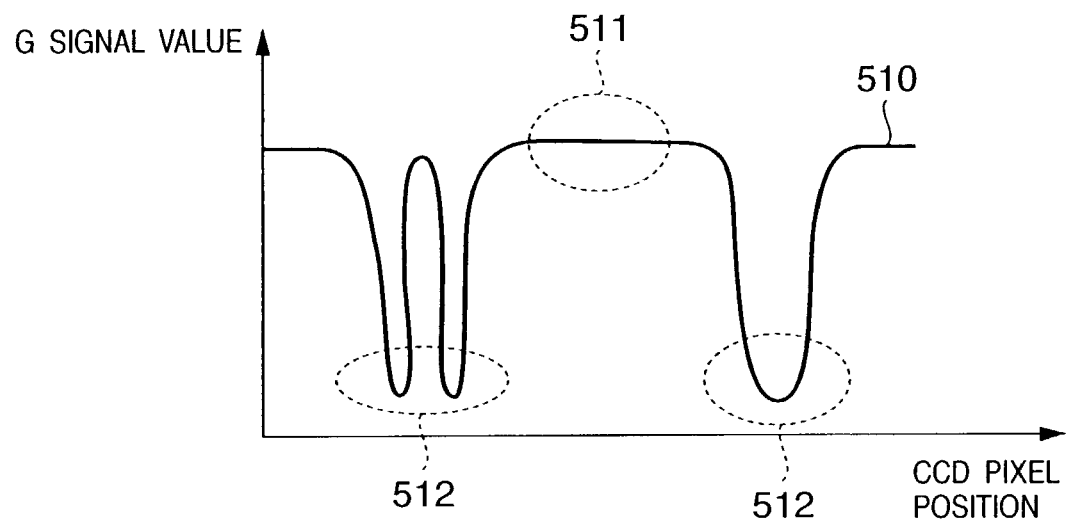
FIGS. 5A and 5B show an example of image data input to the image processing apparatus according to the embodiment of the present invention.
Figure 5B:
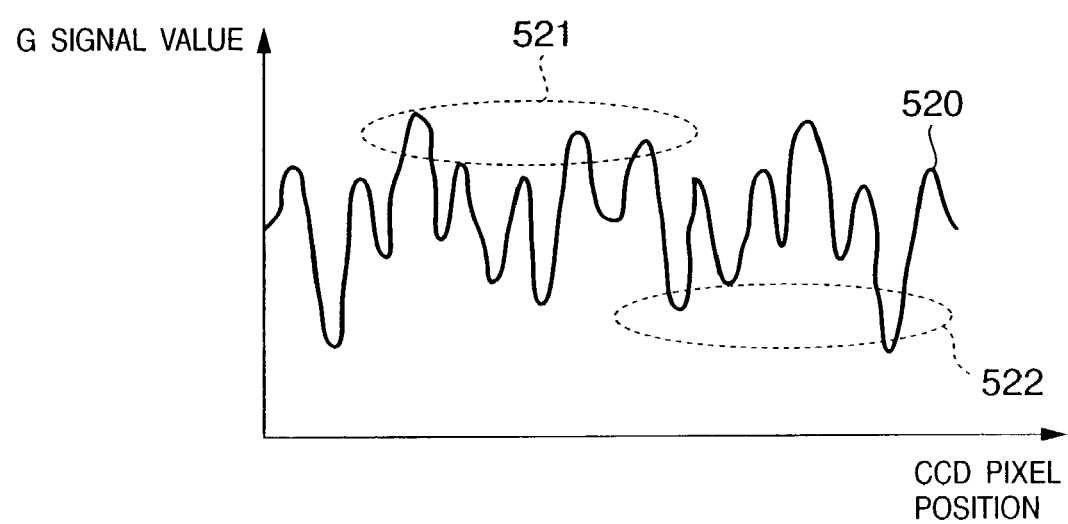

In FIGS. 5A and 5B, curves 510 and 520 respectively indicate examples of characteristic features that respectively appear when the regions 410 and 420 in FIG. 4A are read.

Features for respective regions will be explained below. The curve 510 indicates the characteristics of the text region 410. Since black characters are written on a white background, a plot of signal values indicates characteristics in which signal values abruptly change from a white background portion 511 to a character portion 512.

The curve 520 indicates the characteristics of the photo region 420 as a halftone dot image. Since a white background 521 and a halftone dot 522 printed on the white background repetitively appear, a plot of signal values indicates characteristics in which white and black levels repetitively and frequently appear, as shown in FIGS. 5A and 5B.

Whether or not a read pixel has a text or photo attribute can be determined by checking the aforementioned features for respective regions detected from the signal values. For this purpose, a known feature extraction method based on the change amount of image data near the pixel of interest or the accumulated value of change amounts in a given period, the luminance values (white or color background) of surrounding pixels, the number of times of changes from white to black of image data in a given period, and the like, may be used, and a known attribute determination method based on the feature extraction result may be used.

Figure 4B:
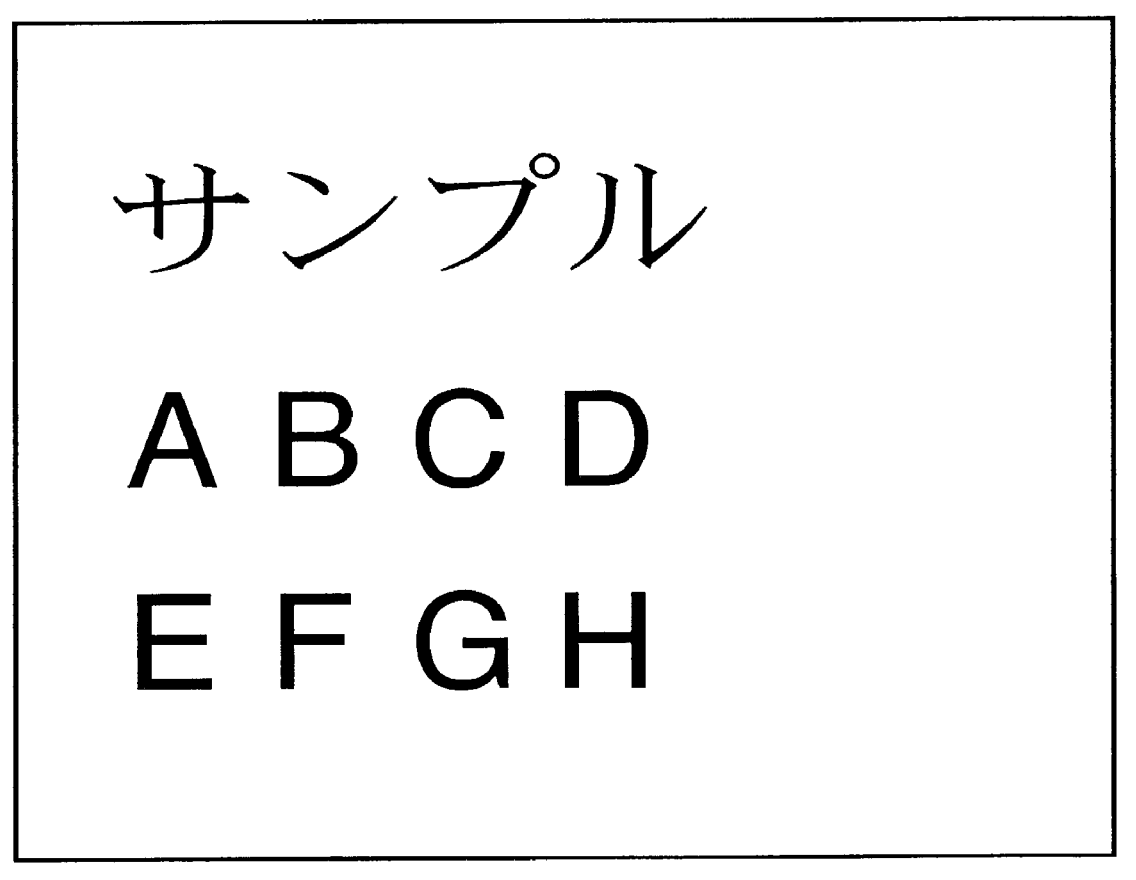

As a result of the image region separation process, for example, if a pixel which forms a black character portion in a document image is found, "1" is output as the attribute flag of that pixel; otherwise, "0" is output. FIG. 4B shows text attribute flag data in a region which is determined to be a text region as a result of the image region separation process. Black pixels in FIG. 4B have a text attribute, and text attribute flag=1 is generated. In the remaining photo region, a text attribute flag=0 (blank portion in FIG. 4B).

In this way, the image scanner unit 130 outputs attribute flag data 132 to the image encoding unit 1405 together with image data 131.

On the other hand, the page description language (PDL) rendering unit 140 executes a process when image data from the image input apparatus 1401 is described in a page description language. That is, the PDL rendering unit 140 generates image data by interpreting PDL commands. At this time, the PDL rendering unit 140 identifies black character pixels as in the image scanner unit 130 with reference to information indicating the type of command, thus generating attribute flag data. The PDL rendering unit 140 inputs image data 141 and attribute flag data 142 to the image encoding unit 1405.

Note that attribute flag data 132 and 142 are not limited to those which indicate black characters. For example, multi-bit information indicating various attributes such as a color text region, halftone dot region, vector graphics region, and the like may be used as attribute flag data.

(2) Image Encoding Unit, Image Data Saving Unit, Image Decoding Unit

The image encoding unit 1405 and image decoding unit 1407 respectively encode and decode an image on the basis of image data (131 or 141) and attribute flag data (132 or 142) input from the image data input unit 1404. The image saving unit 1406 saves image data encoded by the image encoding unit 1405.

Reference numeral 100 denotes a selector for switching an image input system; 101, a compression block line buffer; 102, an attribute flag data encoder; 103, an image data encoder; 104, a compression memory; 105, a large-capacity external storage device (HDD); 106, a compression memory; 107, an attribute flag data decoder 107; 108, an image data decoder; and 109, a rasterization block buffer. Also, reference numeral 110 denotes a printer unit which serves as an I/F with the aforementioned image output apparatus 1403. These functional blocks (100 to 110) will be described below in combination with the processing flow (that pertains to encoding of image data) shown in FIG. 6.

If an input instruction of image data is issued from a control means (not shown) (step S600), the image data input unit 1404 executes an input process of image data (step S601). The selector 100 can switch the image data input unit 1404 according to a purpose intended. The selector 100 receives the aforementioned attribute flag data 132 (or 142) from the image input unit 1404 together with the input image data.

The compression block line buffer 101 segments the image data input a plurality of tiles. After that, image data for respective tiles are inputted to the image data encoder 103. Also, the attribute flag data for respective pixels are inputted to an encoding attribute discrimination unit 120 and the attribute flag data encoder 102, and generates an attribute flag for each image region (step S602).

Assume that each tile has a size of M pixels×N pixels (M and N are natural numbers) for the sake of simplicity. Encoding of color information using discrete cosine transformation encoding (JPEG) and that of attribute flag data using runlength encoding are executed for each tile, i.e., for M×N pixels.

When discrete cosine transformation encoding is applied as an encoding method, M and N must be integer multiples of a window size. In this embodiment, if the window size for compression is 8×8 pixels, and M=N=32, a tile consisting of 32×32 pixels is further broken up into 16 blocks each having 8×8 pixels, and JPEG compression is done for 8×8 pixels. In the following description, M=N=32, but the present invention is not limited to these specific values.

Also, discrete cosine transformation encoding and runlength encoding will be exemplified as examples of encoding methods. However, the present invention is not limited to these specific methods, and other encoding methods may be used.

The encoding attribute discrimination unit 120 checks by a statistical process if each of the attribute flag data of 32×32 pixels inputted from the compression block line buffer 101 indicates a text attribute (step S603) Note that the attribute flag is assigned to each pixel. Furthermore, in this embodiment, the attribute flag of each tile is determined. This is because a compression encoding process is done for each tile in this embodiment. Hence, the number of pixels per tile, which are determined to have a text attribute, is counted (steps S604 and S605). If the number i of pixels with the text attribute contained per tile is larger than a predetermined threshold value j, that tile is determined to be a tile with a text attribute (step S606). This process is repeated for the entire image to determine if each tile has a text or photo attribute (steps S607 and S608). Subsequently, information indicating if the image is inputted by a single or continuous scan in the image input apparatus 1401 is received from the control means such as a CPU or the like (not shown) (steps S609-1 and S609-2).

Whether the image is inputted by a single or continuous scan is defined as follows. A single scan corresponding to the aforementioned image reader 1101, i.e., a case wherein a document image is read by an image reader without the ADF 1200, or a case wherein a document is directly placed on a document table glass 1103 without using the ADF 1200 and is scanned is defined as a single scan, and a scan using the ADF 1200 is defined as a continuous scan independently of the number of scanned documents.

Furthermore, when the ADF 1200 is used, an operation for counting the number of pages of a bundle of documents may be executed prior to a scan. More specifically, a series of steps shown in FIG. 13 are executed to count the number of pages of a bundle of documents before document images are captured by actual scans. When this count value is equal to or larger than a predetermined value, such scan is defined as a continuous scan; otherwise, it is defined as a single scan. The predetermined value may be varied depending on the capacities of the compression memory 104 and the storage medium of the external storage device 105. For example, if the storage capacity corresponds to 10 A3-sized documents, a continuous scan up to 10 A3-sized documents may be defined as a single scan; a scan of more than 10 documents may be defined as a continuous scan.

An encoding quantization matrix selector 121 selects a quantization matrix used in encoding on the basis of the results of steps S607 to S609-2, and outputs a quantization matrix select signal to the image data encoder 103 (steps S610 and S611). A practical selection method of quantization coefficients (quantization matrix) will be described later.

The image data encoder 103 quantizes 16 8×8 pixel windows contained in one tile by known DCT using the selected quantization matrix to generate encoded image data (step S612). On the other hand, the attribute flag data encoder 102 encodes the attribute flag data of pixels contained in one tile to generate encoded attribute flag data.

Encoded data (encoded image data and encoded attribute flag data) generated by the attribute flag data encoder 102 and image data encoder 103 in this way are stored as compressed image data in the hard disk 105 via the compression memory 104.

Upon outputting the stored compressed image data via the printer unit 110, the compressed image data stored in the hard disk 105 is read out, and is decoded and output in the following sequence.

The attribute flag data decoder 107 reads out and decodes data for M×N pixels of the encoded attribute flag data, which were compressed and stored. A decoding attribute discrimination unit 122 executes an attribute discrimination process on the basis of the decoding result of the encoded attribute flag data. Since the discrimination process at that time is the same as the processes in steps S603 to S611 in FIG. 6, a description thereof will be omitted.

A decoding quantization matrix selector 123 selects decoding coefficients (dequantization matrix in this embodiment) used in decoding on the basis of this discrimination result. The image data decoder 108 decodes image data for respective tiles using the decoding coefficients selected in this way, and outputs the result to the rasterization block line buffer 109.

The decoding attribute discrimination unit 122 can execute the same process as in the encoding attribute discrimination unit 120. This is because the discrimination results for a given tile upon encoding and decoding become equal to each other since the attribute flag data are compressed by reversible compression such as runlength encoding free from deterioration. Therefore, even when each tile is quantized using different quantization coefficients, dequantization coefficients suitable for each tile are set upon decoding, thus obtaining correctly decoded image data.

When the image encoding unit 1405 executes a compression encoding process of attribute flag data for respective tiles in place of attribute data for respective pixels, the decoding attribute discrimination unit 122 can be omitted. This is because the attribute flag data for respective tiles are data themselves to be obtained by the decoding attribute discrimination unit 122. A detailed description of such case will be given in the second embodiment.

Figure 2A:
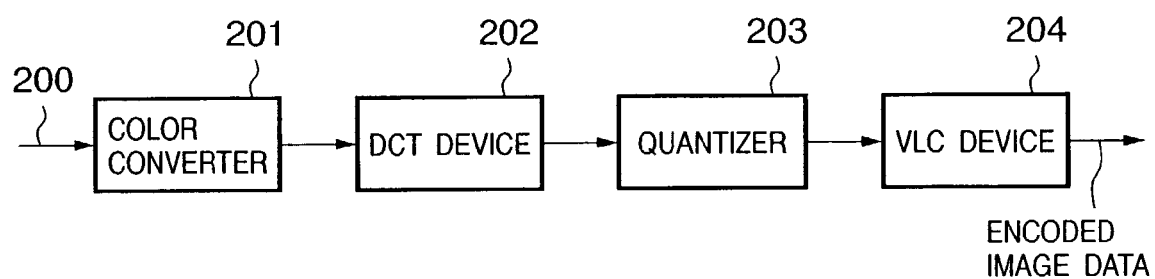
FIGS. 2A and 2B are block diagrams showing details of an image data encoder and decoder in the image processing apparatus according to the first embodiment of the present invention.

FIG. 2A is a detailed block diagram of the compression encoding process in the image data encoder 103. Referring to FIG. 2A, reference numeral 200 denotes image data for each of a plurality of tiles segmented by the compression block line buffer 101. In case of color signals, the image data 200 includes three-color, i.e., red (R), green (G), and blue (B) 256-level signals.

Reference numeral 201 denotes a color converter for converting R, G, and B signals into luminance and color difference signals (Y, Cb, Cr). Reference numeral 202 denotes a discrete cosine transformation (DCT) device for computing the spatial frequency transforms (DCTs) of each of the luminance and color difference signals for 8×8 pixels. Reference numeral 203 denotes a quantizer for quantizing DCT coefficients using a set quantization matrix, thus reducing the data size. Reference numeral 204 denotes a variable-length encoding (VLC) device for executing a Huffman encoding process of the quantized values to further reduce the data size.

Figure 2B:
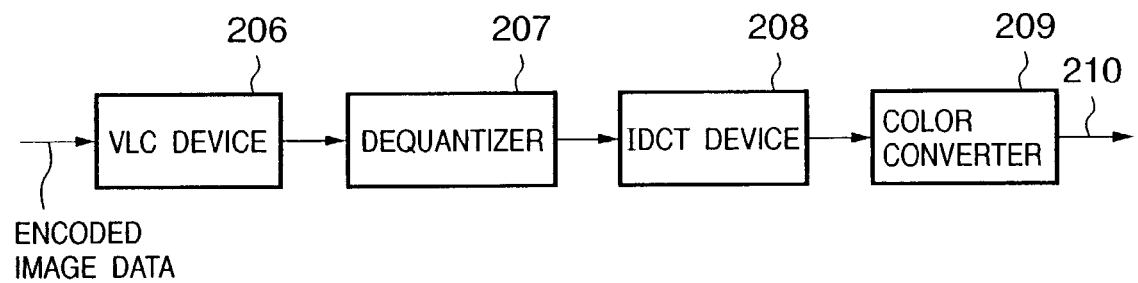

FIG. 2B is a detailed block diagram of the decoding process in the image data decoder 108. Referring to FIG. 2B, reference numeral 206 denotes a variable-length decoding (VLD) device for executing a Huffman decoding process. Reference numeral 207 denotes a dequantizer for restoring data decoded by the VLD device 206 to DCT quantization coefficients using a set dequantization matrix. Reference numeral 208 denotes an IDCT device for computing the inverse DCTs of the DCT coefficients to acquire luminance and color difference signals. Reference numeral 209 denotes a color converter for converting the luminance and color difference signals into R, G, and B signals. Reference numeral 210 denotes color image signals, which are externally output as a result of the decoding process.

Figure 3:
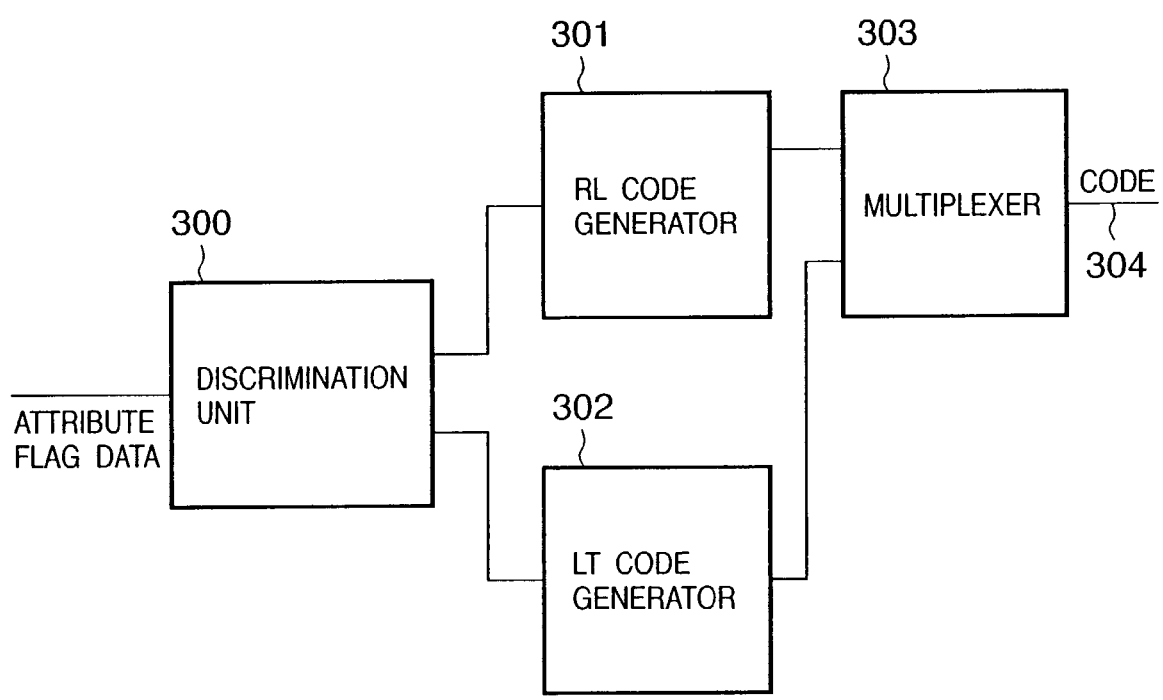
FIG. 3 is a block diagram showing details of an attribute flag encoder in the image processing apparatus according to the first embodiment of the present invention.

FIG. 3 is a detailed block diagram of the attribute flag data encoder 102. Referring to FIG. 3, a discrimination unit 300 discriminates if the previous and current pixels have the same input attribute flag data values. If the two pixels have the same values, the unit 300 switches to send data to an RL code generator 301; otherwise, the unit 300 switches to send data to an LT code generator 302.

The RL code generator 301 counts the number of times that the previous and current pixels have the same values until different data appears, and finally outputs repetitive data.

The LT code generator 302 counts the number of times that the previous and current pixels have different values, and outputs a code word corresponding to the count value, and the minimum number of bits that form actual data, in correspondence with the count value.

A multiplexer 303 multiplexes the output data from the RL and LT code generators 301 and 302, and outputs the multiplexed data as a code 304 (encoded attribute flag data).

A method of switching quantization matrixes in the encoding attribute discrimination unit 120, decoding attribute discrimination unit 122, encoding quantization matrix selector 121, and decoding quantization matrix selector 123 depending on attribute flag data will be explained below.

FIG. 4A shows an example of a document image which includes both photo and text regions, i.e., shows the configuration of the entire page.

FIG. 4B shows attribute flag data generated for the document image shown in FIG. 4A. FIG. 4B illustrates an extracted text region alone.

Figure 4C:
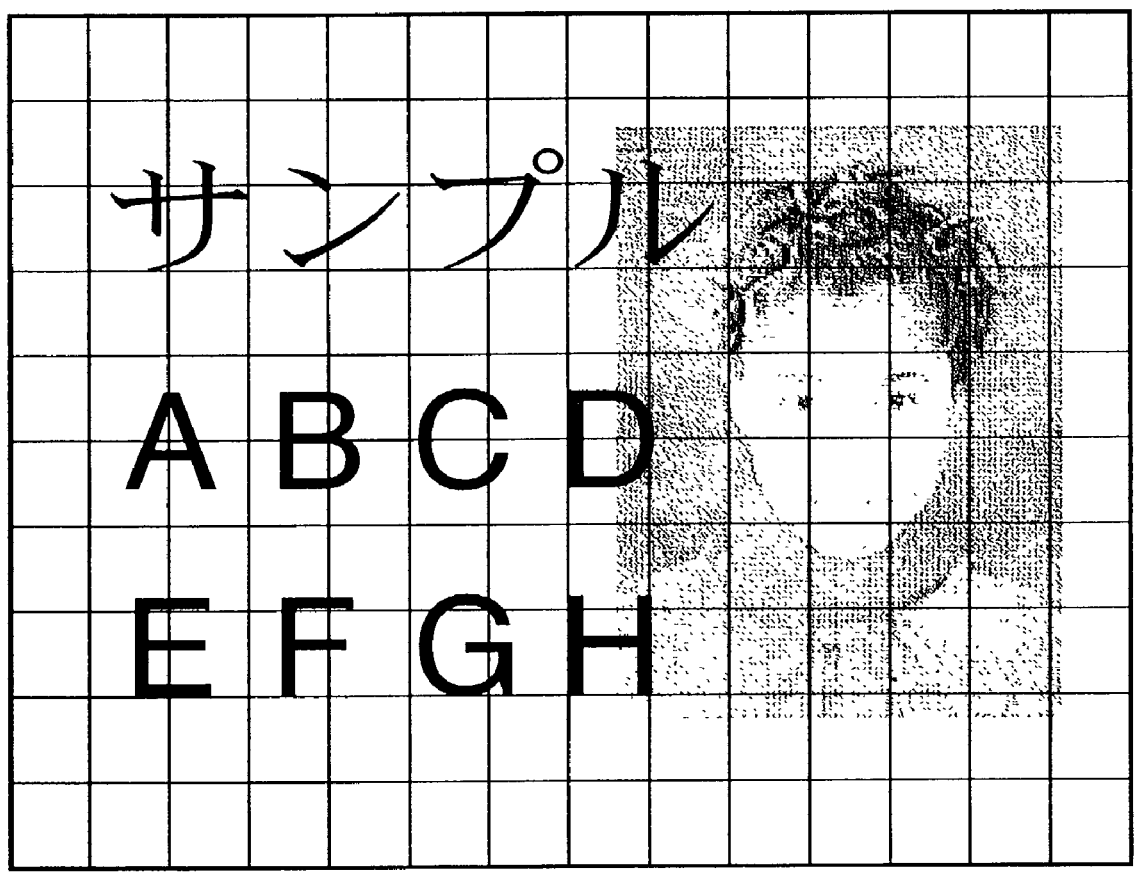
FIG. 4C shows tiles which are obtained by segmenting the entire document image by the image processing apparatus according to the first embodiment of the present invention, and each of which consists of 32 pixels×32 pixels.

FIG. 4C shows a state wherein the entire document image is segmented into tiles each consisting of M×N pixels (32×32 pixels in this embodiment). A quantization matrix can be set for each 32×32 pixel region.

Figure 4D:
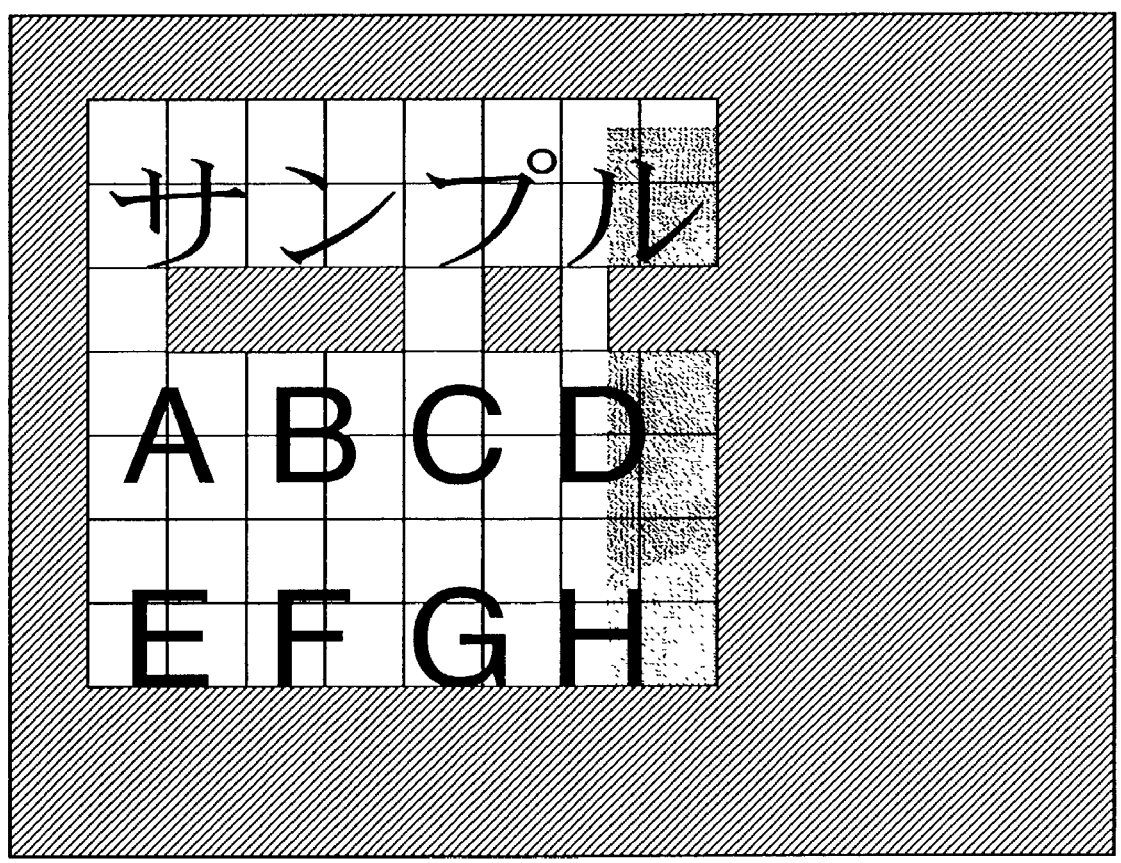
FIG. 4D shows an example of tiles with and without text attributes, which are segmented by image processing apparatus according to the first embodiment of the present invention.

FIG. 4D shows an example in which the tiles are classified into those with and without a text attribute with reference to the attribute flag data in FIG. 4B. In FIG. 4D, hatched tiles are identified as those which do not include any characters.

It is then checked if each tile contains a character. If a tile of 32×32 pixels contains at least one pixel with a text attribute flag, it can be determined that the tile contains a character. Or the number of pixels with text attribute flag data is counted within a tile, and only when the count value exceeds a predetermined threshold value, it can be determined that the tile contains a character.

After the tiles are identified, as shown in FIG. 4D, the encoding quantization matrix selector 121 and decoding quantization matrix selector 123 select a quantization matrix suitable for a tile with a text attribute and a quantization matrix suitable for a tile with a photo attribute that does not contain any character from those stored in the quantizer 203 and dequantizer 207 shown in FIGS. 2A and 2B in accordance with whether image data is inputted by a single or continuous scan and whether each tile has a text or photo attribute, thus encoding and decoding image data. That is, a quantization matrix is dynamically varied in accordance with the scan mode (scan method identification information) of input image data and a text or photo region in the image, thus encoding and decoding image data.

Since deterioration of image quality due to compression is inconspicuous in a photo region compared to a text region, coarser quantization steps can be set for the photo region. Hence, a high compression ratio can be assured, and the storage size of the compressed image can be greatly reduced compared to that of an original image.

In a single scan, when the size of encoded data generated by the encoders 102 and 103 exceeds the capacity of the compression memory 104 and hard disk 105, a re-scan may be made as a compressed image error, and the scanned image data may be compressed using a compression table that assures a higher compression ratio so that the size of the compressed data falls within the capacity of the compression memory 104 and hard disk 105. However, in a continuous scan mode, since documents are read successively, basically a re-scan cannot be made. Therefore, in order to make a re-scan, a mechanism for returning the already read document must be added to the ADF 1200. With this method, however, the cost inevitably increases. Hence, a quantization matrix for each region is changed as follows depending on the single or continuous scan, thus avoiding a re-scan.

For the sake of simplicity, a quantization matrix for the photo region will be fixedly examined. T1 indicates an example of this photo quantization matrix as that for 8×8 DCT coefficients:

$$T1 = \begin{pmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 49 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix}$$

A quantization matrix for a text region in case of a single scan is described by:

$$T2 = \begin{pmatrix} 02 & 02 & 02 & 02 & 03 & 05 & 06 & 07 \\ 02 & 02 & 02 & 02 & 03 & 06 & 07 & 06 \\ 02 & 02 & 02 & 03 & 05 & 06 & 07 & 06 \\ 02 & 02 & 03 & 03 & 06 & 09 & 09 & 07 \\ 02 & 03 & 04 & 06 & 07 & 11 & 11 & 08 \\ 03 & 04 & 06 & 07 & 09 & 11 & 12 & 10 \\ 03 & 07 & 08 & 09 & 11 & 13 & 13 & 11 \\ 03 & 10 & 10 & 10 & 12 & 12 & 11 & 10 \end{pmatrix}$$

In general, an upper left value in a matrix represents a quantization step for a DC component of DCT coefficients, and values represent quantization steps for higher-frequency components to the right or lower side. As a smaller numerical value is set, the quantization step is smaller, i.e., information of an original image is preserved more accurately. In matrix T2, smaller numerical values are set to the right or lower side compared to T1. That is, compared to a photo region quantization matrix, a text region quantization matrix can eliminate deterioration of a text image due to compression since information of high-frequency components is preserved, although the compression ratio becomes low.

However, with the setups of matrices T1 and T2, high image quality can be assured but a high compression ratio for the entire image cannot be expected. In case of a continuous scan in which it is practically difficult to make a re-scan compared to a single scan, such setups are very risky. Hence, in a continuous scan, a quantization matrix for a text region is described by:

$$T3 = \begin{pmatrix} 07 & 05 & 05 & 07 & 10 & 17 & 21 & 25 \\ 05 & 05 & 06 & 08 & 11 & 24 & 25 & 23 \\ 06 & 06 & 07 & 10 & 17 & 23 & 28 & 23 \\ 06 & 07 & 09 & 12 & 21 & 35 & 33 & 25 \\ 08 & 09 & 15 & 23 & 28 & 44 & 42 & 31 \\ 10 & 15 & 23 & 26 & 33 & 42 & 46 & 37 \\ 20 & 26 & 32 & 35 & 42 & 49 & 49 & 41 \\ 29 & 37 & 39 & 40 & 45 & 45 & 42 & 40 \end{pmatrix}$$

Since information of high-frequency components is dropped compared to T2, this quantization matrix can assure a high compression ratio. In this way, a high compression ratio can be assured for the entire image.

Note that quantization matrices T1, T2, and T3 are merely examples. In matrix T3, high-frequency components are dropped to increase the compression ratio. However, the matrix can be arbitrarily changed in consideration of the balance between high- and low-frequency components.

In this embodiment, three quantization matrices T1, T2, and T3 are described, but four or more quantization matrices may be prepared. Also, the quantization matrix for the photo region has been fixedly explained. However, the photo quantization matrix can also be selected in accordance with the ratios of the text and photo regions.

Upon decoding compressed data, the compressed encoded attribute flag data is decoded, and the number of pixels with a text attribute in a tile is counted to see if that tile corresponds to a text region. Dequantization matrices corresponding to T1 and one of T2 and T3 are set based on the checking result and the result indicating a single or continuous scan so as to decode data.

In the above description, quantization matrices T1, T2 and T3, and corresponding dequantization matrices are pre-stored in the quantizer 203 and dequantizer 207 shown in FIGS. 2A and 2B, are selectively used in accordance with the attribute of image data and the condition indicating a single or continuous scan, and are switched for respective tiles. As a result, a re-scan can be avoided, and no mechanism for a re-scan need not be added to the ADF 1200.

<Second Embodiment>

In the first embodiment, the quantization and dequantization matrices to be set are switched with reference to attribute flag data for respective pixels. More specifically, in the first embodiment, upon decoding compressed image data, attribute flag data for respective pixels must be decoded, and the decoded flag data must be statistically processed for one tile. In other words, both the encoding and decoding sides must comprise a count block for the statistical process.

Furthermore, both the encoding and decoding sides must check if the input method is a single or continuous scan mode.

Hence, in the second embodiment, code information tn which indicates one of quantization matrices T1, T2, and T3, which is used by the quantizer, is stored in the header field of compressed image data for each tile.

Figure 7:
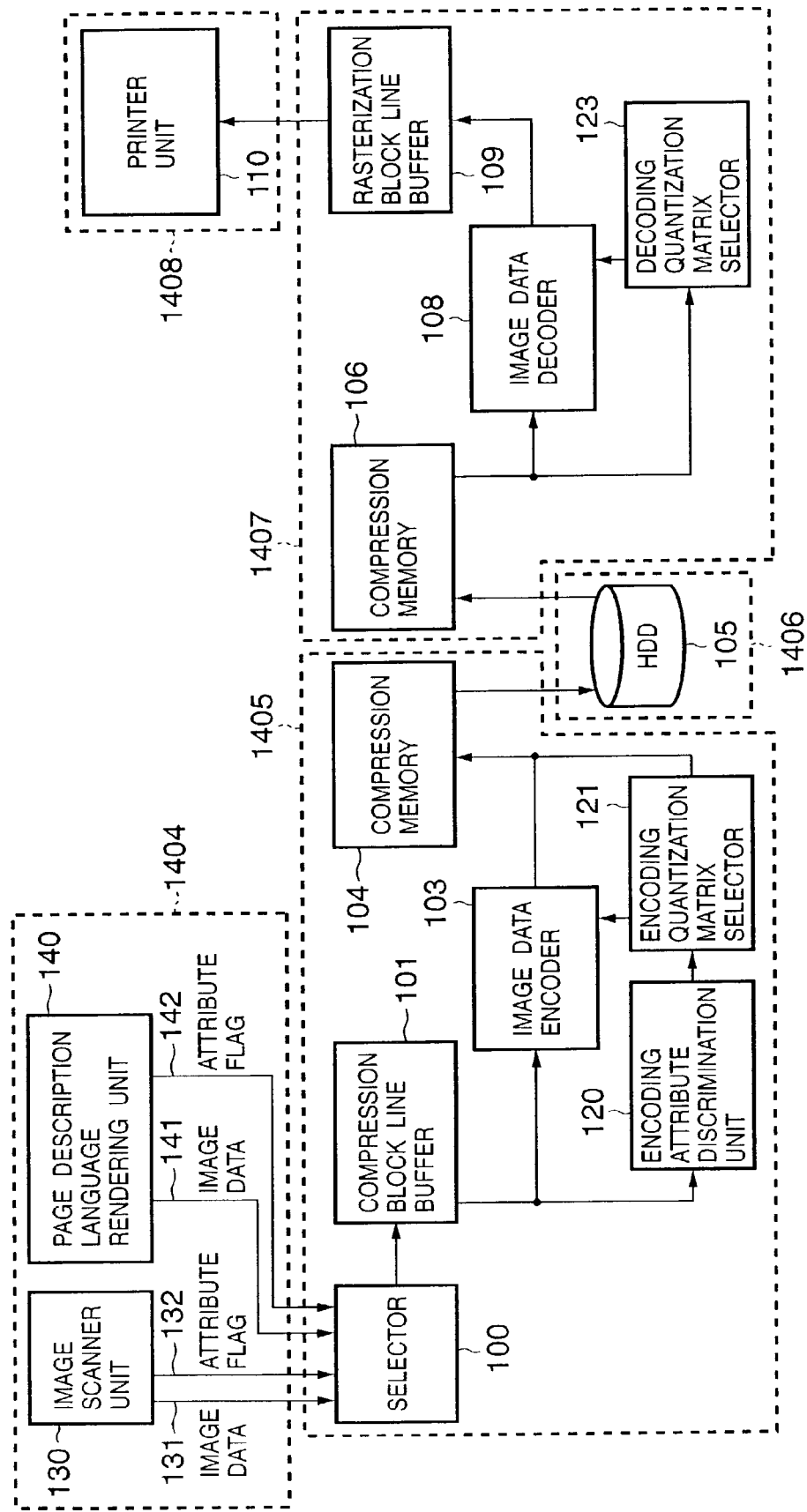
FIG. 7 is a block diagram showing the arrangement of an image processing apparatus according to the second embodiment of the present invention.

FIG. 7 shows the arrangement of an image processing apparatus according to this embodiment. The same processes as those in the first embodiment are executed until the quantization matrix is selected. When the encoding quantization matrix selector 121 selects a quantization matrix Tn (n=1, 2, 3, . . . ), it outputs code information tn (n=1, 2, 3, . . . ) of the selected quantization matrix Tn to the compression memory. This code information tn is identification information of the quantization matrix Tn.

Figure 9:
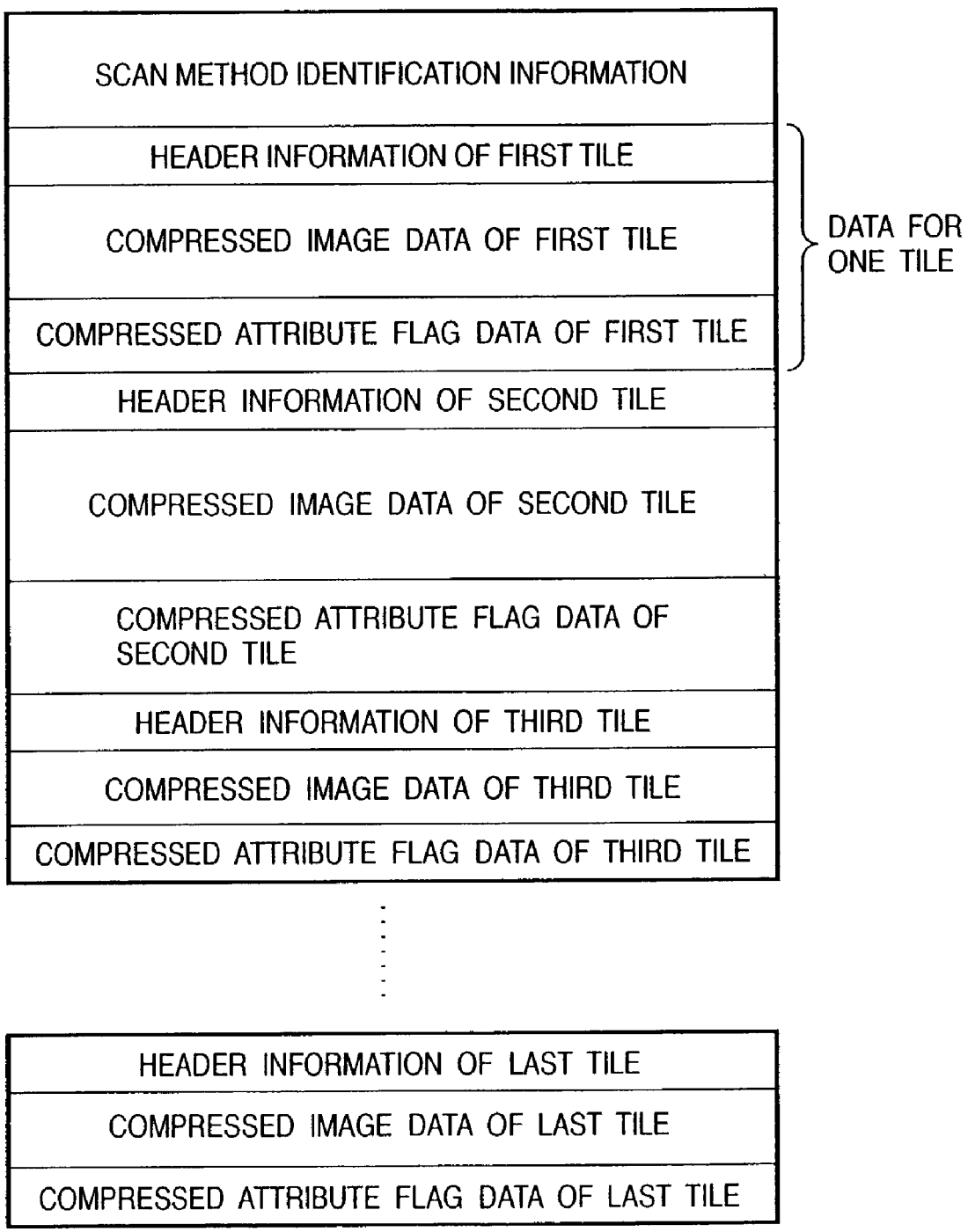
FIG. 9 shows the data structure in the image processing apparatus according to the second embodiment of the present invention.

FIG. 9 shows the data structure when the compressed image data and attribute flag data are stored in a compression memory (104, 106). Scan method identification information, i.e., information for identifying a single or continuous scan is stored from the head of data. Then, header information of the first tile, DCT-encoded image data, and runlength-encoded attribute flag data of the first tile are stored, those of the second tile, third tile, . . . are successively written with the same configuration, and information is written until the last tile contained in one page. Note that the runlength-encoded attribute flag data is allocated at the footer position, but may be allocated at the header position. The header information of each tile records the data size of compressed data, tile number, and the like, and also code information tn which indicates T1, or T2 or T3 used as the quantization matrix of image data.

In the second embodiment, the scan method identification information and attribute flag data in FIG. 9 can be omitted. Upon decoding recorded encoded data, information indicating one of T1, T2, and T3 is read with reference to the header information to select a corresponding dequantization matrix used in dequantization.

Figure 8:
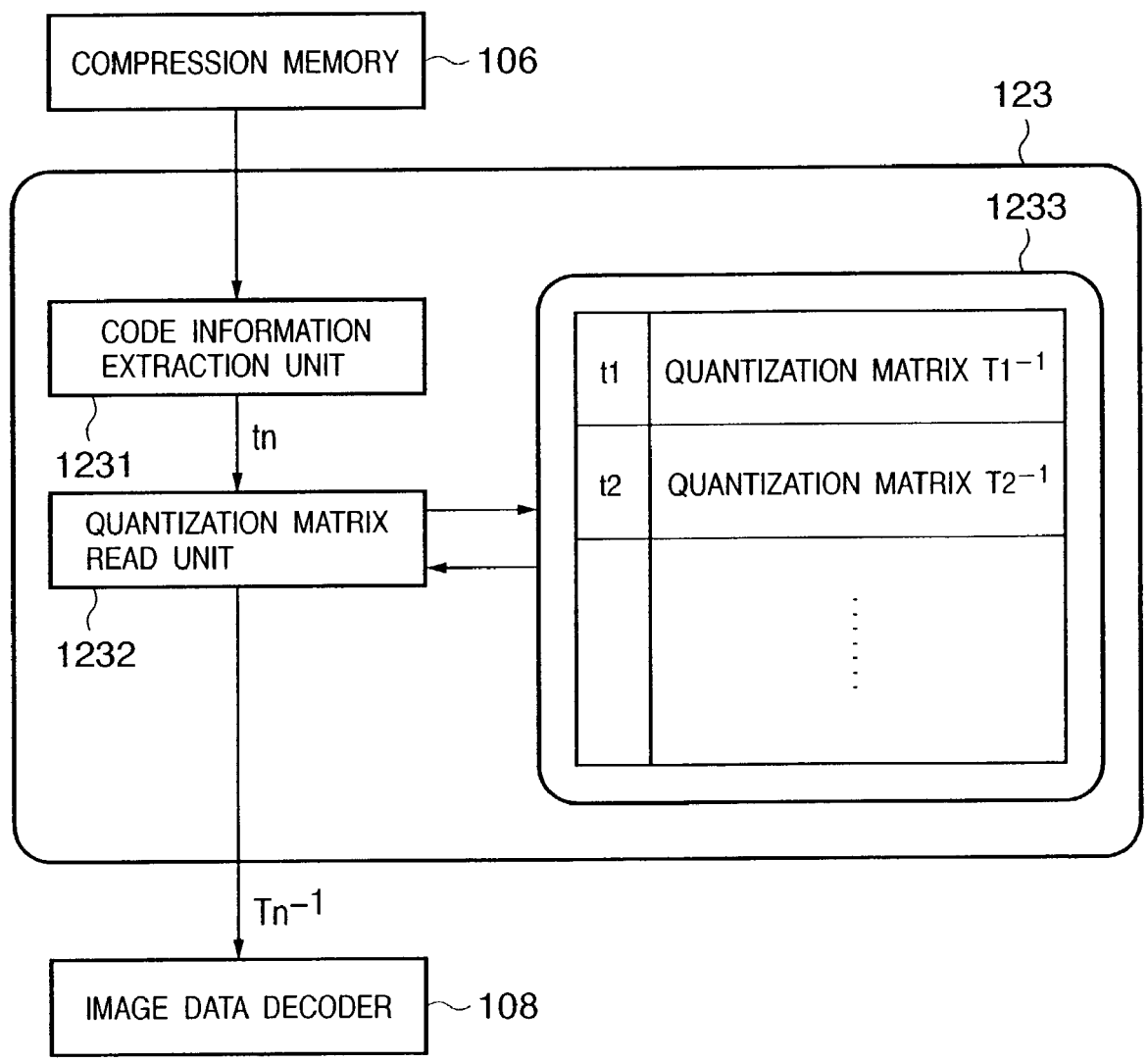
FIG. 8 is a block diagram showing the arrangement of a decoding quantization matrix selector in the image processing apparatus according to the second embodiment of the present invention.

FIG. 8 shows an example of the arrangement of the decoding quantization matrix selector 123. When the decoding process is launched on the decoding side, a code information extraction unit 1231 reads out code information tn from header information stored in the compression memory, and outputs it to a quantization matrix read unit 1232. The quantization matrix read unit 1232 reads out a dequantization matrix $Tn^{-1}$ corresponding to the code information tn from a storage device 1233, and outputs it to the image data decoder 108.

Information other than the code of the quantization matrix may be used. For example, attribute information for each region may be used.

In this embodiment, the encoded tile data and header are alternately allocated, but another data structure may be used. For example, the headers of all the tiles may be allocated together. Or two corresponding headers may be allocated together before two compressed tile data. That is, the data structure is not particularly limited as long as an encoding method used to encode each tile can be estimated.

Furthermore, scan method identification information may be inserted in each packet header.

In this embodiment, upon decoding compressed image data, since the dequantization matrix can be switched with reference to only the header field, attribute flag data for respective pixels need not be referred to upon decoding.

For this reason, the attribute flag data encoder 102 can be omitted on the encoding side. On the other hand, the attribute flag data decoder 107 and decoding attribute discrimination unit 122 of attribute flag data can be omitted on the decoding side. Hence, the present invention can be practiced using an arrangement simpler than the first embodiment.

<Third Embodiment>

In the third embodiment, an arrangement when the image processing apparatus according to the first embodiment of the present invention shown in FIG. 1 is connected to a predetermined network will be explained with reference to FIG. 10.

Figure 10:
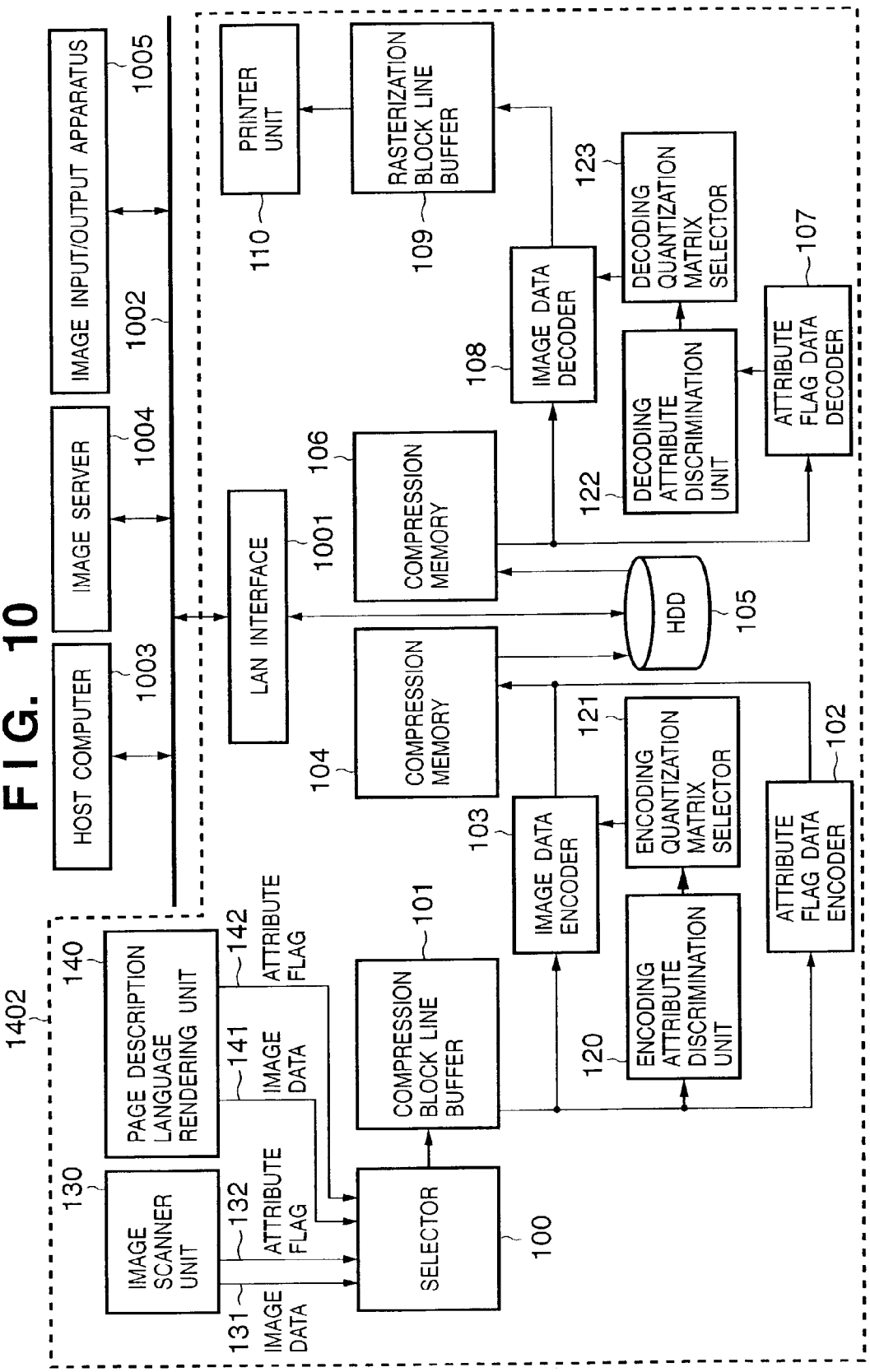
FIG. 10 is a block diagram showing the arrangement of an image processing apparatus according to the third embodiment of the present invention.

Referring to FIG. 10, reference numeral 1001 denotes a LAN interface, which is an interface that can connect a network 1002.

Compressed image data stored in the external storage device (HDD) 105 that stores compressed images can be sent to a host computer 1003, image server 1004, image input/output apparatus 1005, and the like, which are connected to the network 1002, via the LAN interface 1001 and network.

Also, compressed image data can be received from the host computer 1003, image server 1004, image input/output apparatus 1005, and the like, which are connected to the network 1002, via the network, and can be stored in the external storage device 105.

The LAN interface 1001 may be connected to the compression block line buffer 101, rasterization block line buffer 109, encoding compression memory 104, decoding compression memory 106, or the like other than the HDD 105. However, since it is efficient to send/receive compressed images in consideration of the load on the network, the LAN interface is preferably connected to the HDD 105.

Although not shown, a JPEG encoder and decoder for implementing encoding and decoding that do not require any attribute flag data may be added, and may be used upon exchanging data with an apparatus which does not use attribute flag data.

Furthermore, the image processing apparatus may be connected to an image transmission/reception apparatus such as a facsimile or the like that uses a telephone line, so as to transfer an image, or may be connected to another image input/output apparatus, image server, host computer, and the like via a wireless network or the like so as to send/receive an image.

<Fourth Embodiment>

In the above embodiments, in order to implement a compression encoding process with a high compression ratio while suppressing deterioration of image quality, a region that suffers tremendous deterioration of image quality and a region that suffers relatively slight deterioration of image quality upon encoding are discriminated for input image data, and undergo different compression encoding processes. Also, whether input image data is obtained by a continuous or single scan is discriminated together. In case of a continuous scan, a higher compression ratio is set in advance to avoid a re-scan due to buffer overflow, thus improving the continuous scan speed.

However, the method of avoiding a re-scan is not limited to that in the above embodiment. That is, any buffer overflow may be detected in advance, and the compression ratio may be changed as needed during the compression encoding process. An embodiment to be described below will explain a case wherein a re-scan is avoided by such method.

Figure 15:
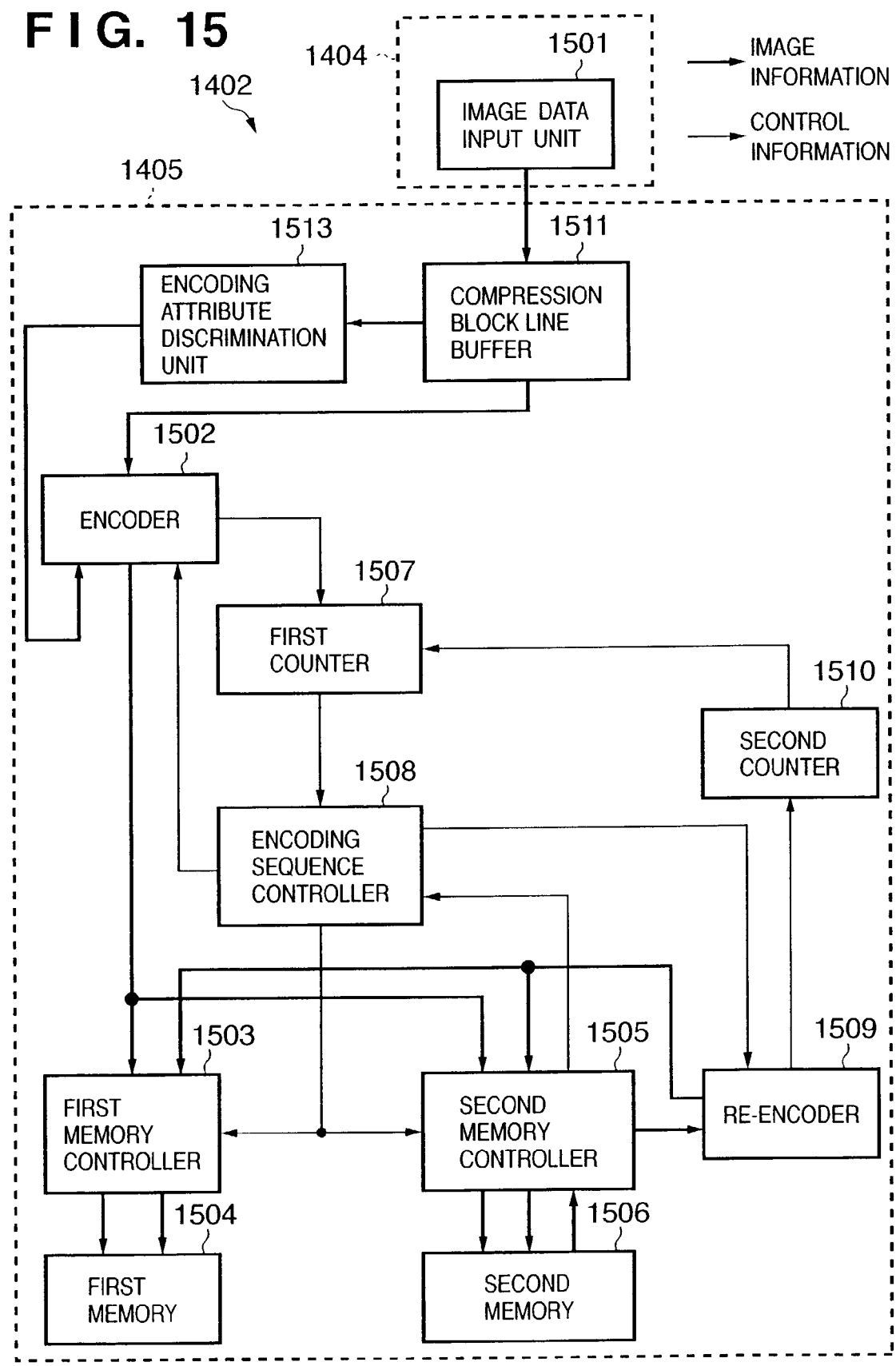
FIG. 15 is a block diagram showing an image processing apparatus according to the fourth embodiment of the present invention.

FIG. 15 is a functional block diagram of an image processing apparatus 1402 of this embodiment. Respective units shown in FIG. 15 will be briefly explained.

The image processing apparatus 1402 comprises an image data input unit 1501 for inputting image data from, e.g., an image scanner. The image scanner includes a known image region separation processor, which generates attribute flag data for each pixel used to identify if a pixel forms a black character portion in a document image. Upon determining whether or not a pixel forms a black character, in case of a non-natural image such as a character, line image, or the like, a change in density is steeper than that of a natural image such as a photo or the like. Hence, it is checked if a change in density (luminance or density difference between neighboring pixels) is larger than a predetermined threshold value, and a pixel of a black character can be determined when it is determined that the change in density is larger than the threshold value and R, G, and B values assume nearly equal values (achromatic color). In addition to information indicating whether or not a pixel forms a black character (black character line image), information indicating whether or not a pixel forms a color character, halftone dot region, vector graphics region, and the like may be included. In such case, bits may be assigned to respective attributes.

In the above description, the image data input unit 1501 receives image data from the image scanner, which includes the image region separation processor. If the image scanner does not comprise that processor, the aforementioned checking process may be provided to the main apparatus side. In addition to image data from the image scanner, the image data input unit 1501 may input a page description language rendering unit, may load an image file stored in a storage medium, or may receive a file from a network in some cases. Upon rendering page description language data received from a host computer, since the page description language indicates an attribute of each pixel, it is easy to check the attribute. Furthermore, when the image scanner does not include the image region separation processor, the main apparatus side may comprise a processor for checking the attribute.

In any case, image data input from the image data input unit 1501 is temporarily stored in a compression block line buffer 1511. The compression block line buffer 1511 segments image data into tiles (each tile size is M×N pixels), and each tile (M×N pixels) selectively undergoes discrete cosine transformation encoding (JPEG) as encoding for a color image, or runlength encoding as encoding for attribute flag data.

Note that M and N must be integer multiples of a window size for discrete cosine transformation encoding. In the JPEG compression method used in this embodiment, since the window size for compression is 8×8 pixels, if, for example, M=N=32, a tile consisting of 32×32 pixels is further broken up into 16 blocks each having 8×8 pixels, and JPEG compression is done for 8×8 pixels. In the following description, M=N=32, but the present invention is not limited to these specific values.

An encoder 1502 quantizes 16 8×8 pixel windows contained in an input tile image (32×32 pixels) by known DCT. Quantization coefficients (to be referred to as a quantization matrix hereinafter) used in this case can be selectively set for each tile by a method to be described later.

An encoding attribute discrimination unit 1513 receives attribute flags of 32×32 pixels corresponding to image data to be encoded, executes a discrimination process (to be described later), and outputs a quantization coefficient select signal to the encoder 1502 in accordance with the discrimination result. Attribute flag data is assigned to each pixel. However, since an encoding method used in a tile consisting of M×N pixels is fixed in this embodiment, attribute flag data in a tile must be analyzed to determine attribute flag data which represents that tile (details will be described later).

The encoder 1502 encodes input image data on the basis of the discrimination result from the encoding attribute discrimination unit 1513 and an instruction from an encoding sequence controller 1508. Note that an encoding method uses known JPEG encoding, the orthogonal transforms of image data corresponding to 8×8 pixels are computed to obtain transform coefficients, and the obtained transform coefficients then undergo quantization using a quantization step (to be described later) and a Huffman encoding process. The encoder 1502 runlength-encodes attribute flag data that represents a tile, and outputs it.

First and second memory controllers 1503 and 1505 control to store the encoded data (encoded image data and encoded attribute flag data) output in turn from the encoder 1502 in first and second memories 1504 and 1506. Note that the first memory 1504 holds the finally settled encoded data (that has been compressed to a data size not more than a target value) so as to output that data to a network apparatus, image output apparatus, large-capacity storage device, or the like, which is connected outside the basic arrangement shown in FIG. 15. The second memory 1506 is a work memory that helps a compression encoding process for forming the encoded data on the first memory.

A counter 1507 counts the encoded data size of encoded image data compression-encoded by the encoder 1502, holds the count value, and outputs the count value to the encoding sequence controller 1508 that controls an encoding sequence. Note that the encoded data size of encoded attribute flag data may be counted, but is not counted in this embodiment. This is because the information size of attribute data with respect to the entire image data is originally very small and a high compression ratio can be expected, since one attribute data is assigned to one tile (a region consisting of a plurality of pixels). Note that the encoded data size of encoded attribute flag data may also be counted.

The encoding sequence controller 1508 detects if the count value of the counter 1507 reaches a given setting value. If the encoding sequence controller 1508 detects that the count value has reached the setting value (or the count value has exceeded the setting value), it outputs a control signal to the first memory controller 1503 to discard the data already stored in the memory 1504. The first memory controller 1503 discards the stored data by clearing a memory address counter or an encoded data management table for image data on the basis of this control signal. At this time, the encoding sequence controller 1508 clears the first counter 1507 to zero (the input from the image data input unit 1501 continues), and controls the encoder 1502 to encode data at a higher compression ratio than that which is set so far. More specifically, the controller 1508 controls the data size of encoded image data generated by the compression encoding process of this apparatus to be, e.g., 1/2 finally. Note that the target compression ratio is set at 1/2 in this case, but can be arbitrarily set.

Encoded data after the compression ratio has been changed are respectively stored in the first and second memories 1504 and 1506 via the first and second memory controllers 1503 and 1505 as in the above processes.

Furthermore, the encoding sequence controller 1508 outputs a control signal to the second memory controller 1505 to read out encoded data stored in the second memory 1506 so far and output the readout encoded data to a re-encoder 1509 as encoded data conversion means.

The re-encoder 1509 decodes the input encoded data, executes re-quantization to reduce the data size, executes a compression encoding process again, and outputs the data size at the same compression ratio as that of the encoder 1502, the compression ratio of which has been changed, to a second counter 1510.

Encoded data output from the re-encoder 1509 are respectively stored in the first and second memories 1504 and 1506 via the first and second memory controllers 1503 and 1505.

Whether or not the re-encoding process is complete is detected by the second memory controller. That is, if all encoded data which are to undergo the re-encoding process are read out, the second memory controller 1505 informs the encoding sequence controller 1508 of the end of the re-encoding process. In practice, after not only the read process of the second memory controller 1505 but also the process of the re-encoder 1509 are complete, the compression encoding process is complete.

The count value obtained by the second counter 1510 is added to the counter value held by the first counter 1507 after completion of the re-encoding process. This sum indicates a total of the data sizes in the first memory 1504 immediately after completion of the re-encoding process. That is, upon completion of the encoding processes of the encoder 1502 and re-encoder 1509 for one frame, the counter value held by the first counter 1507 after addition indicates a total data size generated when this apparatus encodes data for one frame (details will be explained later).

The encoder 1502 continues a compression encoding process, as long as image data to be encoded from the image data input unit 1501 remain, independently of whether or not the re-encoding process is complete.

Whether or not the count value of the counter 1507 reaches the given setting value is repetitively detected until the compression encoding process (encoding, re-encoding) of image data for one page input from the image data input unit 1501 is complete, and the aforementioned encoding and re-encoding processes are executed under the control based on this detection result.

Figure 22:
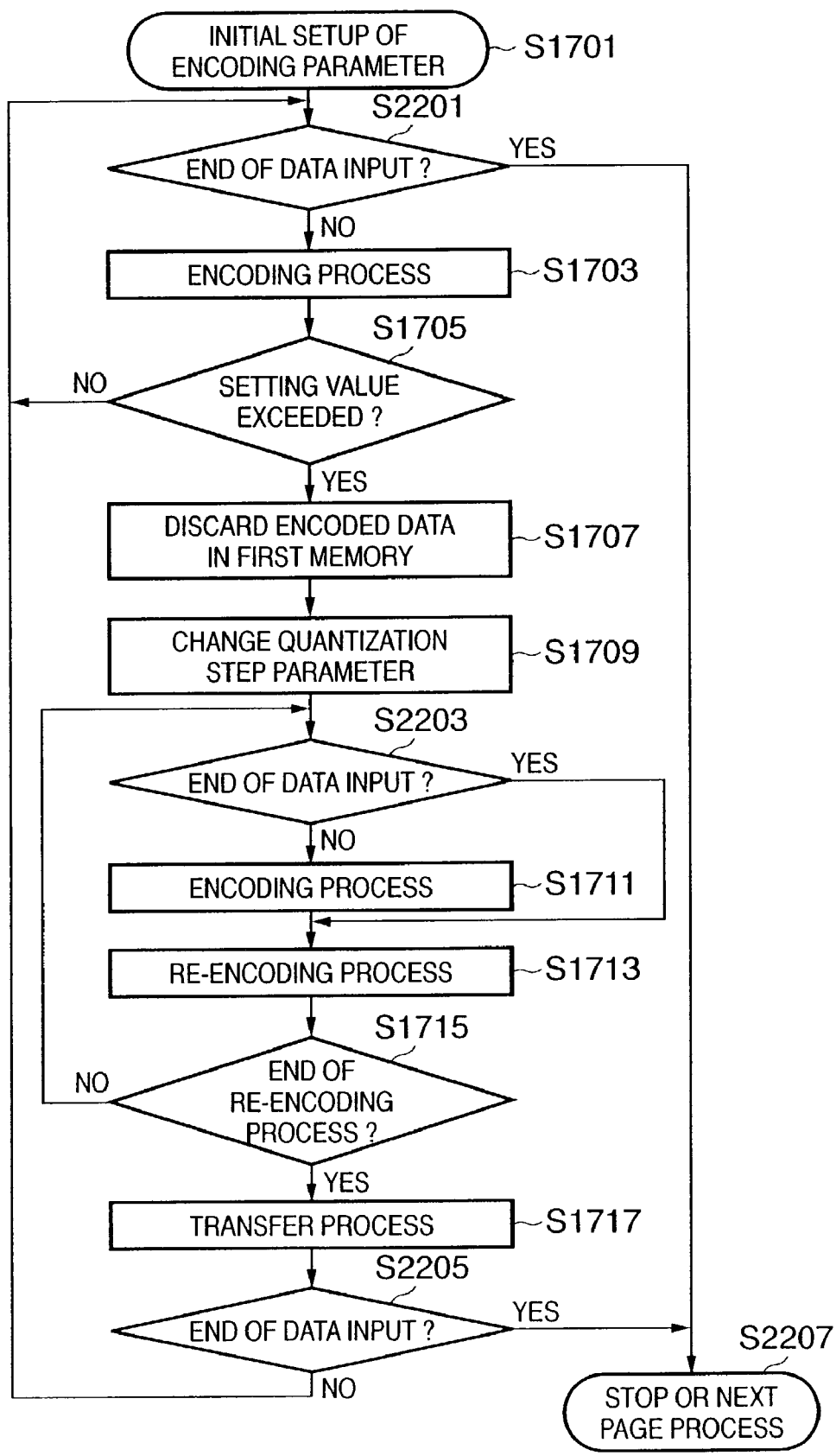
FIG. 22 is a flow chart showing details of the process in the arrangement shown in FIG. 15.

FIG. 22 is a flow chart showing the processing flow in the arrangement shown in FIG. 15, but the processing flow will be explained first with reference to the simplified flow chart in FIG. 17 for the sake of simplicity.

As has been described above, the image processing apparatus 1402 of the present invention executes a compression encoding process of image data for one page, which is inputted from the image data input unit 1501 such as an image scanner or the like, to a predetermined data size or less. In order to implement the compression encoding process, the apparatus has the encoder 1502, re-encoder 1509, first memory 1504, second memory 1506, and the like, in addition to the image data input unit 1501. The compression encoding process is executed using these functional blocks on the basis of the flow chart shown in FIG. 17.

Figure 17:
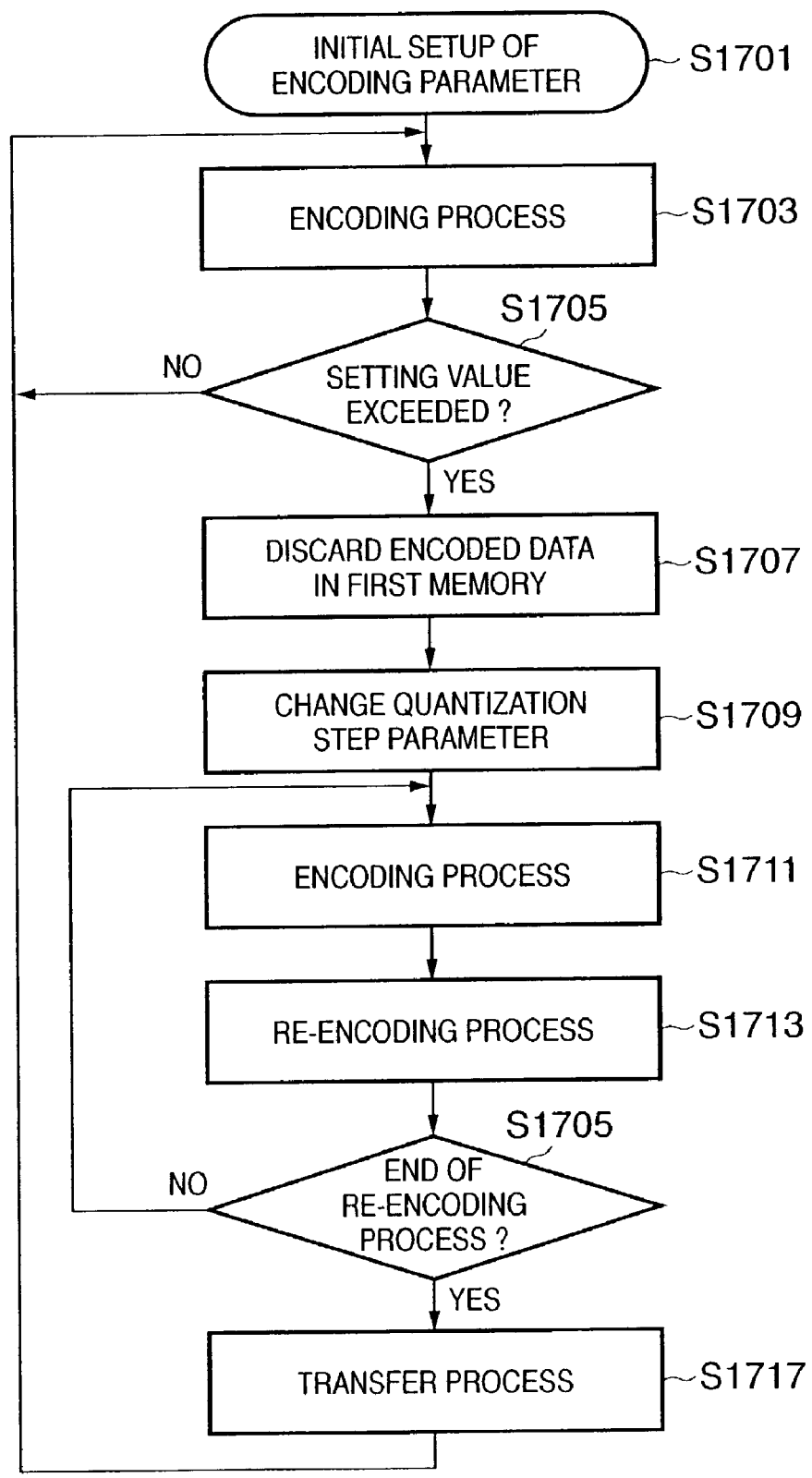
FIG. 17 is a flow chart showing a simplified process in the arrangement shown in FIG. 15.

The flow chart shown in FIG. 17 is roughly classified into the following three processing phases:

(1) Encoding phase
(2) Encoding/re-encoding phase
(3) Transfer phase

FIGS. 18 to 21 visually plainly depict the way image data, encoded data, and the like flow, undergo processes, and are stored in the memories in the respective processing phases.

Figure 18:
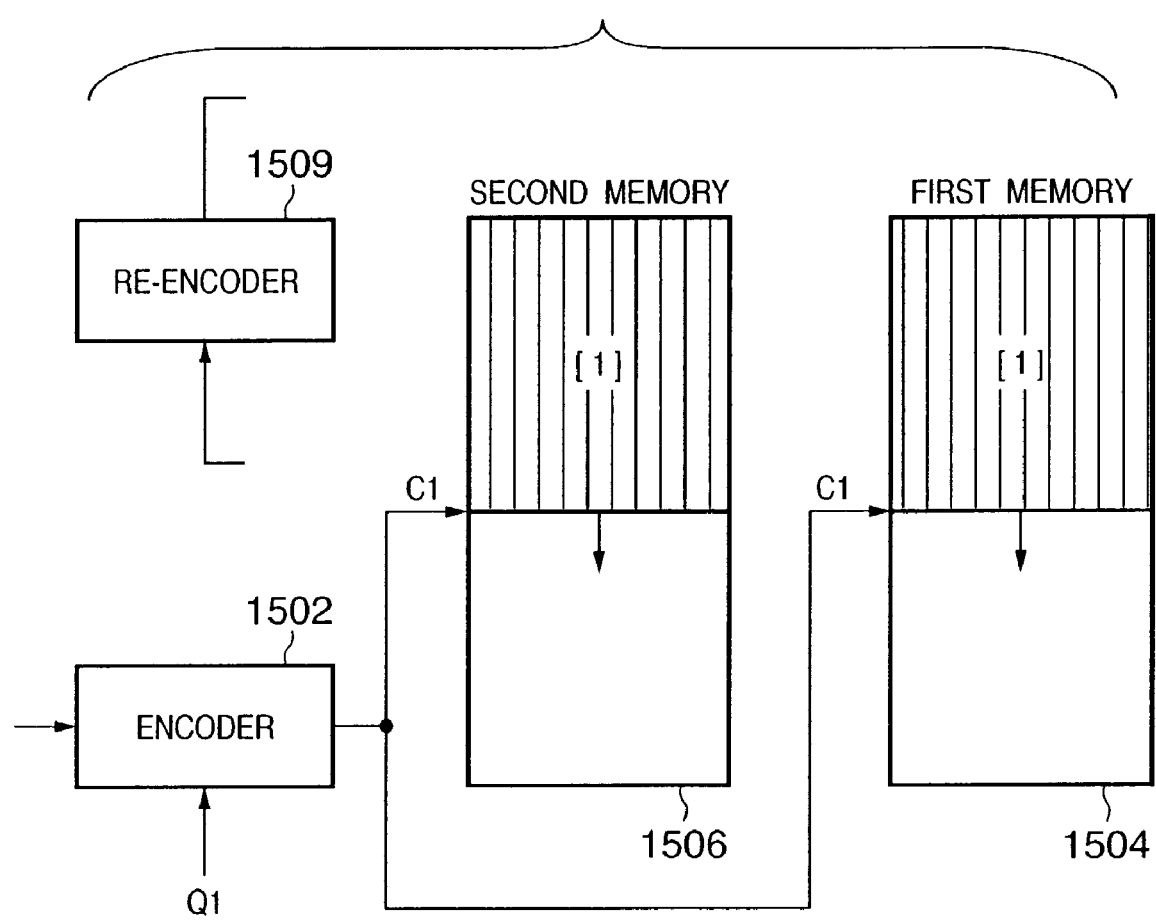
FIG. 18 shows the data flow and memory content in an encoding phase in an initial state.
Figure 19:
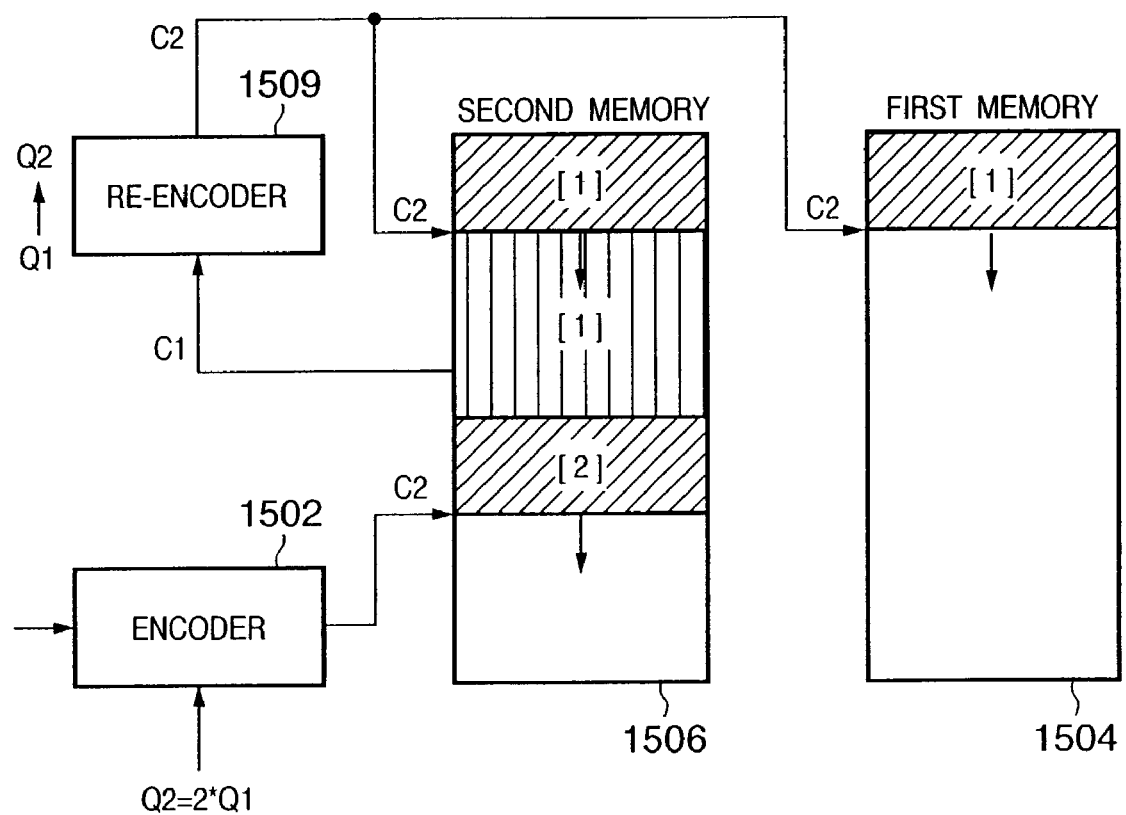
FIG. 19 shows the data flow and memory content in an encoding/re-encoding phase.
Figure 20:
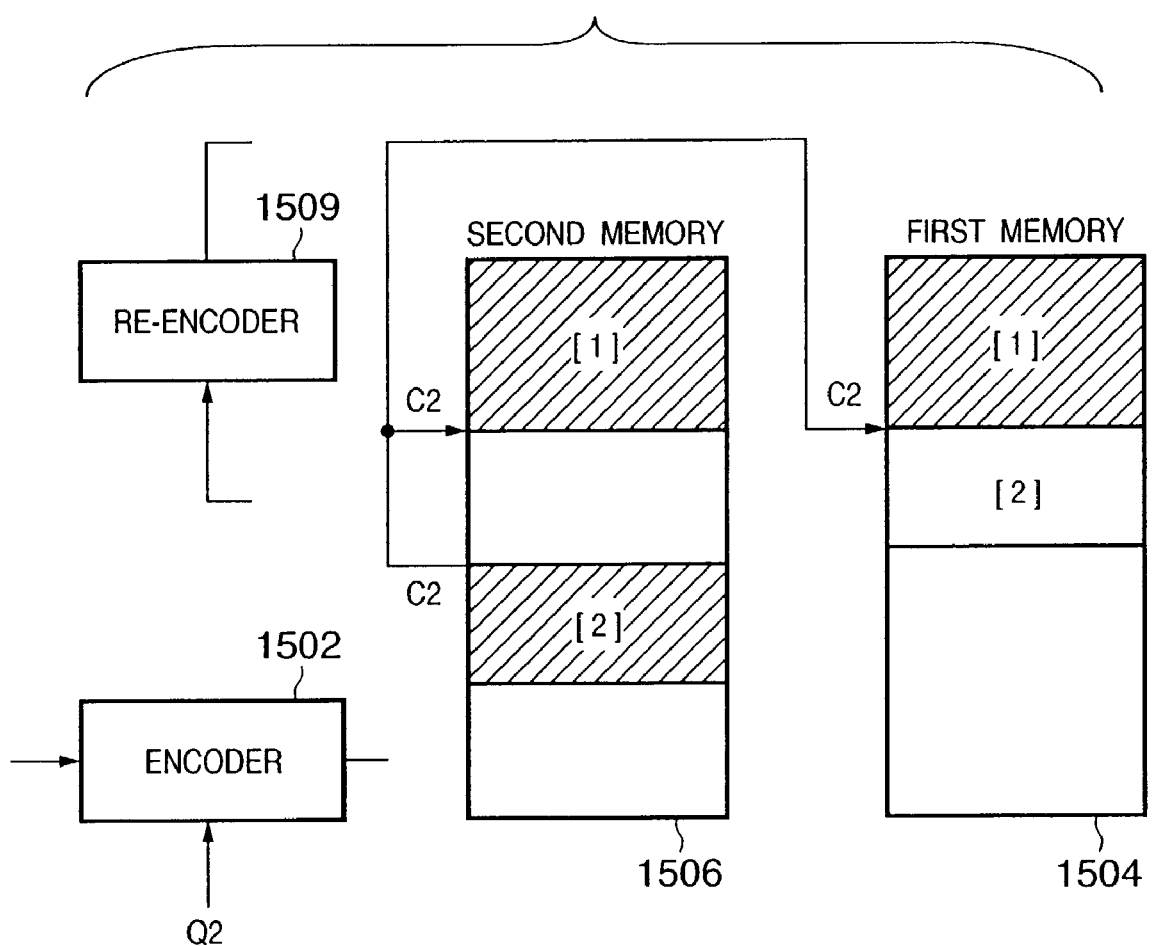
FIG. 20 shows the data flow and memory content in a transfer phase.
Figure 21:
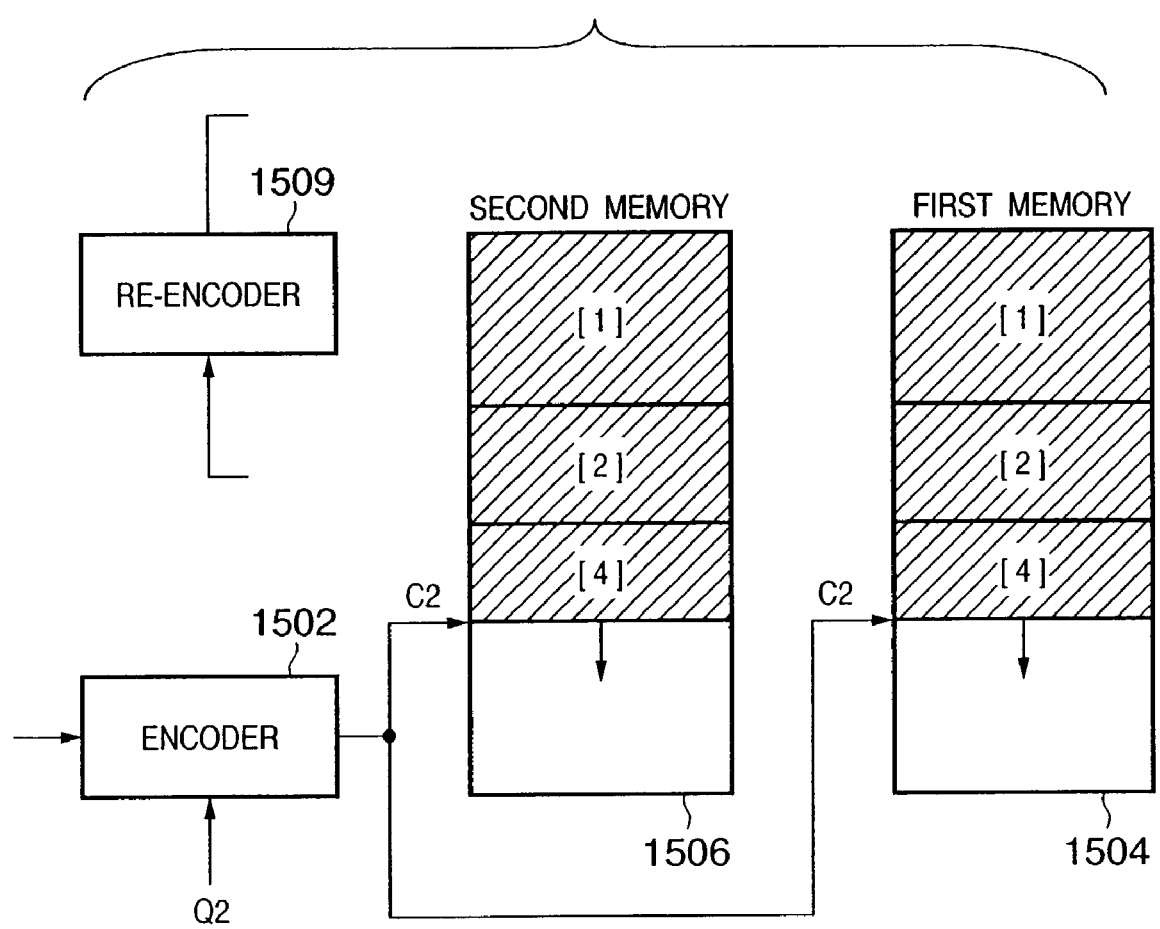
FIG. 21 shows the data flow and memory content in an encoding phase after the transfer phase.

FIG. 18 shows an initial state of an encoding phase corresponding to steps S1703 and S1705 in the flow chart in FIG. 17 (note that processes about encoded data of attribute flag data are not shown). FIG. 19 shows the processing state of an encoding/re-encoding phase corresponding to steps S1707 to S1715, FIG. 20 shows the processing state of a transfer phase corresponding to step S1717, and FIG. 21 shows the processing state of an encoding phase after the transfer phase. The respective phases will be explained below.

1. Encoding Phase

A compression encoding process of image data for one page starts from the initial setups of encoding parameters (step S1701). In this step, the upper limit value of an encoded data size, which is uniquely determined by the image size that is to undergo the compression encoding process (paper size read from the image data input unit 1501 such as an image scanner or the like), and a quantization step parameter (Q1) applied to the encoder (assume that known JPEG encoding is used) are set.

The encoder 1502 quantizes and encodes a pixel block of interest (=32×32 pixels) using this quantization step parameter Q1, and either a text region quantization matrix Q1*a* or a photo region quantization matrix Q1*b* in accordance with the discrimination result in the pixel block (=32×32 pixels) from the encoding attribute discrimination unit 1513. As will be described in detail later, since the legibility of characters is important for a text region, the quantization step for the text region is preferably smaller than that for a photo region. The aforementioned text region quantization matrix Q1*a* and photo region quantization matrix Q1*b* have such differences. As will be described later, when a quantization step parameter Q2 is set, a compression encoding process is done using either a quantization matrix Q2*a* or Q2*b*; when a quantization step parameter Q3 is set, a compression encoding process is done using either a quantization matrix Q3*a* or Q3*b*. Details of such processes will be explained later, and the description of FIG. 17 will be continued.

In step S1703, the first counter 1507 accumulates and counts the data sizes of encoded data which are output by an actual compression encoding process (JPEG compression for every 8×8 pixels of an image).

It is checked in step S1705 if the count value of the data sizes has exceeded the upper limit value. If NO in step S1705, the compression encoding process in step S1703 is continued. This is the initial state of the encoding phase.

Encoded data output from the encoder 1502 are stored in both the first and second memories 1504 and 1506, as shown in FIG. 18. Regions indicated by vertical stripes express the stored encoded data.

Note that the encoder 1502 also executes a compression encoding process of attribute flag data for each tile as the discrimination result from the encoding attribute discrimination unit 1513, and outputs it to the first and second memories. In this case, the arrangement that pertains to compression of attribute flag data in the encoder 1502 is, as shown in FIG. 31.

Figure 31:
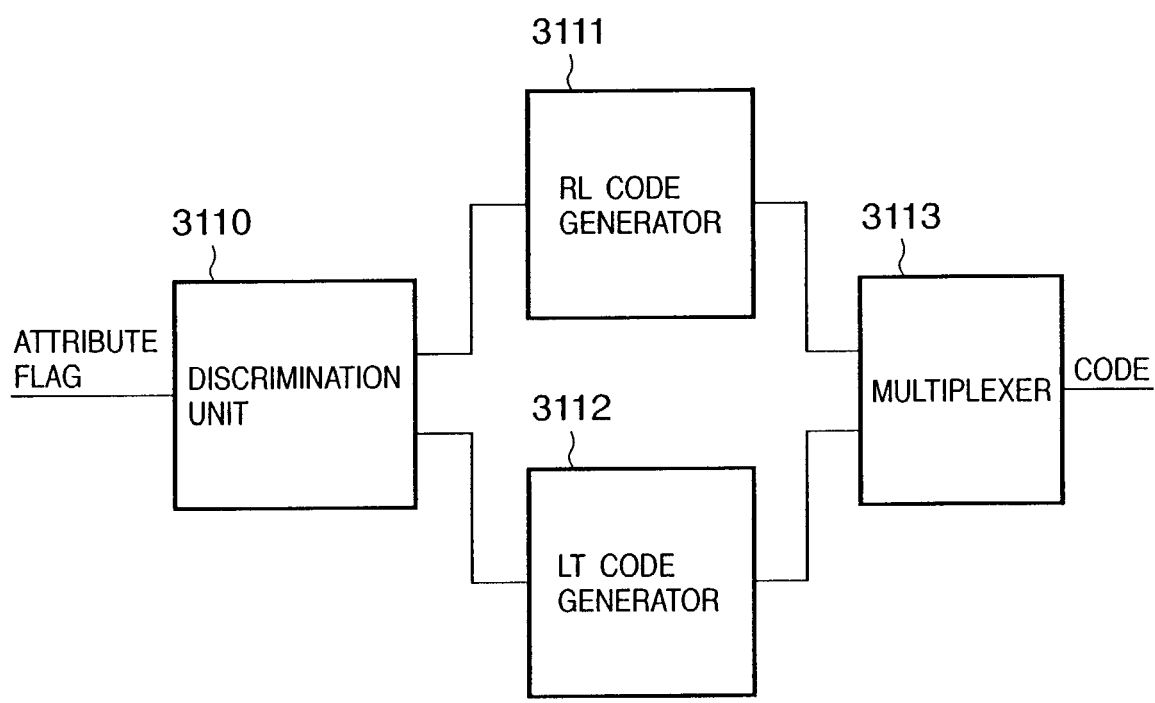
FIG. 31 is a block diagram showing the arrangement of a processor that pertains to encoding of attribute data and is used in each of the embodiments.

FIG. 31 shows the structure of only blocks that pertain to the compression encoding process of attribute flag data in the encoder 1502.

Referring to FIG. 31, an encoding attribute discrimination unit 3110 discriminates if the previous and current values of input attribute flag data have the same values. If the two input attribute flag data have the same values, the unit 3110 switches to send data to an RL code generator 3111; otherwise, the unit 3110 switches to send data to an LT code generator 3112. The RL code generator 3111 counts the number of times that the previous and current attribute flag data have the same values until different attribute flag data appears, and finally outputs repetitive attribute flag data. The LT code generator 3112 counts the number of times that the current attribute flag data has a different value from the previous pixel, and outputs a code word corresponding to the count value, and the minimum number of bits that form actual data, in correspondence with the count value. A multiplexer 3113 multiplexes the output data from the RL and LT code generators 3111 and 3112, and outputs the multiplexed data as a code 3115. Note that this arrangement is an example, and other arrangements may be used to implement such function.

2. Encoding/re-encoding Phase

When the compression encoding process of the encoder 1502 progresses and the count value of the data sizes has exceeded the set upper limit value, encoded data in the first memory 1504 is discarded in step S1707, and the quantization step parameter of the encoder 1502 is changed to Q2 in step S1709 (hence, the encoder 1502 executes a compression encoding process using either the quantization matrix Q2*a* or Q2*b* in accordance with the discrimination result of the encoding attribute discrimination unit 1513).

When the count value of the data sizes of the encoded data has exceeded the set upper limit value, this means that the data size after the compression encoding process cannot fall within the target value. Hence, since it is nonsense to continue the compression encoding process using an identical quantization step, the quantization step parameter is changed to Q2 (the quantization step larger than Q1) so as to reduce the data size.

After the quantization step parameter is changed, the compression encoding process of the encoder 1502 is restarted in step S1711, and the encoded data is stored in only the second memory 1506, as shown in FIG. 19. Parallel to this process, a re-encoding process in step S1713 is done. In the re-encoding process, the encoded data (both encoded image data and encoded attribute flag data) already stored in the second memory 1506 are read out, undergo a re-encoding process in the re-encoder 1509, and are then stored in the two memories 1504 and 1506. The compression encoding process and re-encoding process are continued until all encoded data indicated by vertical stripes [1] are re-encoded. Note that the re-encoder 1509 uses the same quantization step parameter as the new quantization step parameter set in the encoder 1502, and re-encodes using an optimal quantization matrix in accordance with attribute flag data obtained by decoding.

More specifically, this re-encoding process is implemented in such a manner that quantization values obtained after encoded data are Huffman-decoded undergo a bit-shift process that can yield the same results as those obtained by dividing these values by $2^n$, and then undergo Huffman encoding again. This method can assure a fast re-encoding process since the quantization step is changed by only bit shift, and neither an inverse orthogonal transformation process nor re-orthogonal transformation process are done. It is checked in step S1715 if the re-encoding process is complete.

Since the data size after re-encoding becomes smaller than that of encoded data before re-encoding, encoded data after re-encoding can be overwritten on a memory area that stored encoded data before re-encoding, as shown in FIG. 19. Upon completion of the re-encoding process, the data size of encoded data indicated by vertical stripes [1] is reduced to that of encoded data indicated by hatching [1] shown in FIG. 20.

The aforementioned steps S1707 to S1715 are processes to be executed in the encoding/re-encoding phase.

3. Transfer Phase

Upon completion of the re-encoding process, a transfer process is executed in step S1717. In the transfer process, the encoded data indicated by hatching [2], which is stored in only the second memory 1506 in the encoding/re-encoding phase, is transferred to and stored at an address coupled to the encoded data indicated by hatching [1] in the first memory 1504, as shown in FIG. 20. On the other hand, the encoded data indicated by hatching [2] is transferred and coupled within the second memory 1506, so that the encoded data indicating by hatching [1] and the encoded data indicating by hatching [2], which are distributed on the second memory 1506, are successively stored on the first memory 1504. This is the process to be executed in the transfer phase.

Upon completion of the transfer phase, the flow returns to the encoding phase in steps S1703 and S1705, and encoded data indicated by hatching [4] is output from the encoder 1502 and is stored in the two memories 1504 and 1506, as shown in FIG. 21. This encoding phase is slightly different from the encoding phase in the initial state (FIG. 18) in that the quantization step used in the compression encoding process of the encoder 1502 has been changed from Q1 to Q2, and encoded data stored in the two memories 1504 and 1505 are groups of encoded data processed in various phases. If such differences are ignored, the encoding phase immediately after the transfer phase can be considered to be the same as the encoding phase in the initial state.

Therefore, by repeating three phases, i.e., the encoding phase, encoding/re-encoding phase, and transfer phase, encoded data obtained by compressing image data for one page to the set data size or less can be finally stored in the first memory. In addition, the image data input unit 1501 need only continue to input data throughout a series of processes. That is, image data need not be re-inputted from the beginning.

The flow chart shown in FIG. 17 describes only processes corresponding to the respective phases shown in FIGS. 18, 19, and 20 for the sake of easy understanding. However, in practice, the input process of image data for one page comes to an end in one of those phases. Hence, depending on a phase in which the input process is completed, subsequent processes slightly vary. The flow chart in FIG. 22 shows the flow in consideration of such processes. The flow chart in FIG. 22 considers the relationship between completion of the image data input process for one page, and various processes described in FIG. 17, and steps S2201, S2203, S2205, and S2207 are added to the flow chart in FIG. 17.

It is detected respectively in steps S2201, S2203, and S2205 if the input process of image data for one page from the image data input unit 1501 is completed in the encoding phase, encoding/re-encoding phase, and transfer phase.

If it is detected in the encoding phase or transfer phase that the input process of image data for one page is completed (step S2201 or S2205), the flow advances to step S2207 to end the compression encoding process of the page of interest. If image data to be processed for one or more pages remain, a compression encoding process of image data for the next page is started; otherwise, the control halts.

On the other hand, if it is detected in the encoding/re-encoding phase that the input process of image data for one page is completed (step S2203), since the operation in the encoder 1502 must be suspended until all image data have undergone the re-encoding process, the encoding process in step S1711 is skipped, and only the re-encoding process for suppressing the data size of image data that has already undergone the compression encoding process in the encoder 1502 so far to a predetermined encoded data size is continued in step S1713. Upon completion of the re-encoding process, since encoded data of the entire image data for one page are not stored together on the first memory unless the subsequent transfer process is completed, the re-encoding process and the subsequent transfer process must be continued even after the end of the input process of image data for one page. In this case, if completion of the re-encoding process is detected in step S1715, after encoded data stored in only the second memory 1506 in the encoding/re-encoding phase is transferred to the first memory (step S1717), completion of the input process of image data for one page is detected in step S2205, and the flow advances to step S2207.

The operations of FIG. 17 and also FIG. 22 have been explained.

(1) Modification of Memory Storage Method

Figure 23:
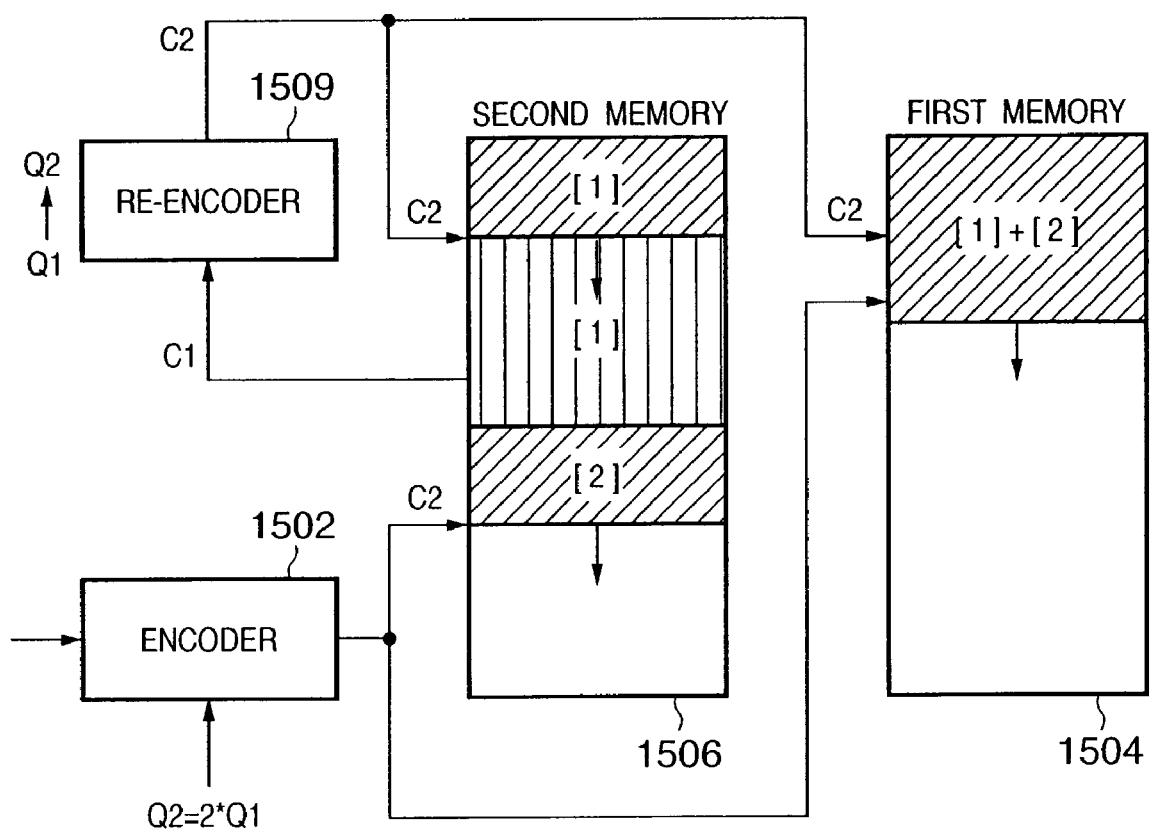
FIG. 23 shows the data flow and memory content in an encoding/re-encoding phase in a modification of the arrangement shown in FIG. 15.
Figure 24:
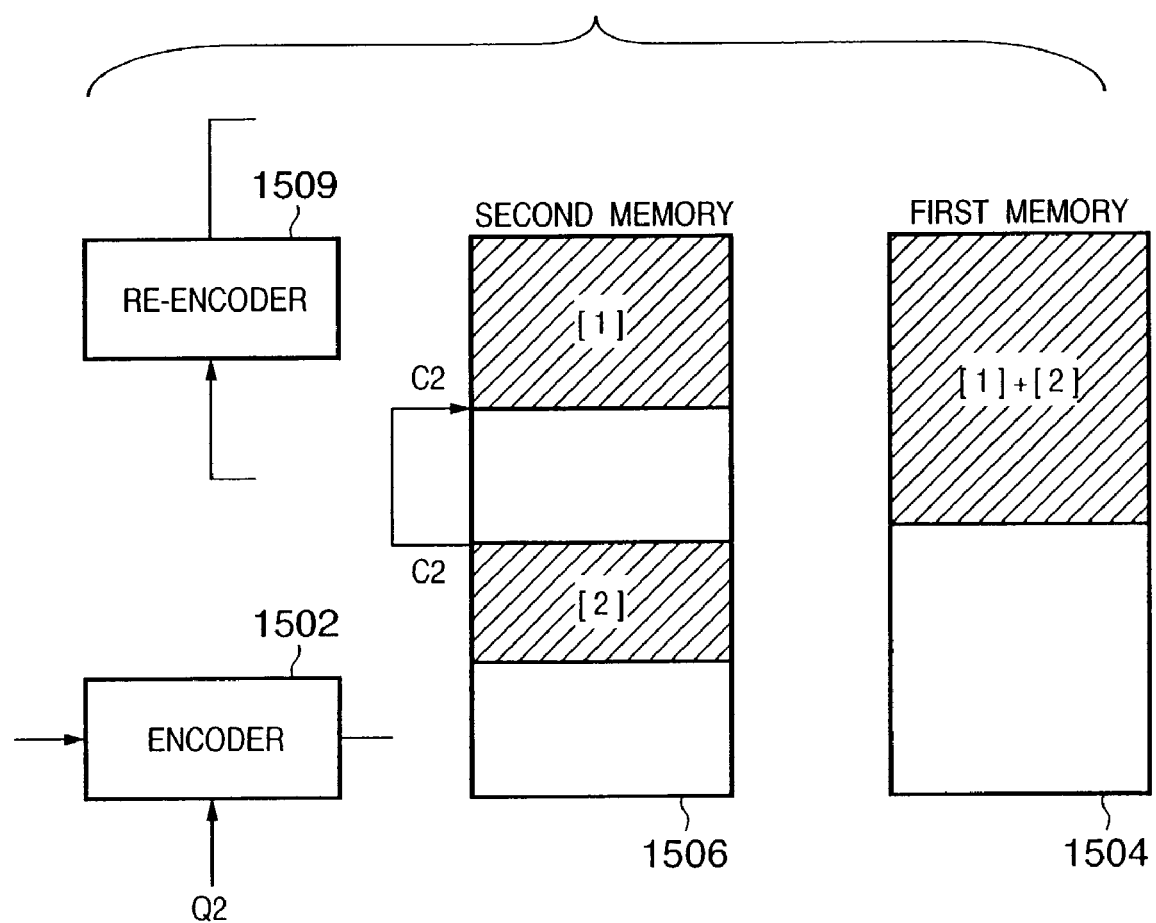
FIG. 24 shows the data flow and memory content in a transfer phase in the modification shown in FIG. 23.

FIGS. 23 and 24 show a modification of the memory storage method shown in the schematic views of FIGS. 19 and 20.

In the schematic view of FIG. 19, encoded data output from the encoder 1502 in the encoding/re-encoding phase is stored in only the second memory 1506. Alternatively, as shown in FIG. 23, encoded data output from the encoder 1502 in the encoding/re-encoding phase is directly stored in both the first and second memories.

When viewed from the encoder 1502, encoded data, which are encoded and output in every phases, are stored in both the memories. Unlike in the schematic view of FIG. 20, the need for data transfer between the two memories in the transfer phase can be obviated, as shown in FIG. 24. In this modification, in the encoding/re-encoding phase, encoded and re-encoded data are sequentially stored in the first memory 1504 in the order they are sent to it. For this reason, two different types of encoded data may mix.

Therefore, in this modification, encoded data are segmented into given units, and are managed as files or packets, so as to solve the above problem. More specifically, a file management table, packet management table, or the like is separately prepared to manage data.

In one method, upon storing encoded data from the encoder 1502 in the first memory 1504, a management number is assigned from the head of image data for each appropriate unit (for example, since the unit of orthogonal transformation is a block consisting of 32×32 pixels, image data for 32×i (i is an integer, and i=1, 2, . . . )), and a management table which can store the start addresses and encoded data sizes of encoded data corresponding to respective management numbers in the order of management numbers is prepared.

The encoder 1502 and re-encoder 1509 hold the management number of image data whose process is in progress, and write the start address and encoded data size upon storing encoded data in the management table on the basis of the management number. In this manner, even when encoded data processed by the encoder 1502 and re-encoder 1509 are randomly stored, the management table is accessed in the order of management numbers, and encoded data are read out from the first memory 1504 on the basis of the start addresses and encoded data sizes read out at that time, thus reading out encoded data in turn from the head of an image. When such management mechanism is provided, sequential data on an image need not be sequentially stored on a memory.

Figure 25:
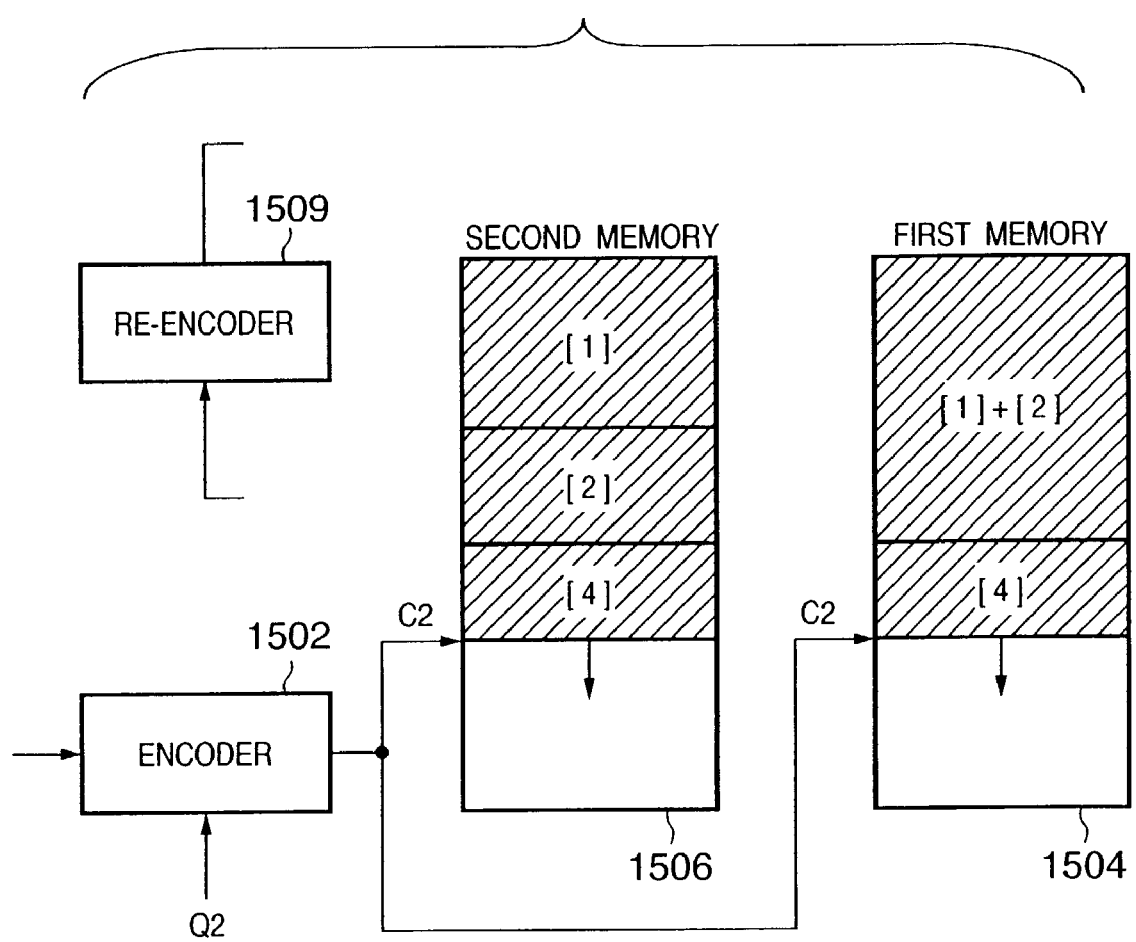
FIG. 25 shows the data flow and memory content in an encoding phase after the transferphase in the modification shown in FIG. 23.

The encoding phase after the transfer phase in the schematic view of FIG. 24 is substantially the same as the two encoding phases (FIGS. 18 and 21) described above, except that the storage state of encoded data in the first memory is slightly different, as shown in FIG. 25. Hence, in this modification, the three phases are repetitively processed as in the above description.

As a result of the above processes, according to this embodiment, when a given document image is read and it is determined during a compression encoding process of the image that the target value has been reached, a subsequent compression encoding process is executed to obtain a higher compression ratio in accordance with a newly set quantization step parameter. When it is determined that the target value has been reached, the encoded data that have already undergone the compression encoding process so far are temporarily decoded, and are re-encoded according to the new quantization step parameter. Therefore, even when the encoded data size to be generated has exceeded the target value during reading of a document, the encoded data size can be suppressed to the target value or less without suspending the read process.

(2) Quantization Matrix

As described above, when a quantization step parameter Qi (i=1, 2, . . . ) is set, the encoder 1502 in this embodiment quantizes transform coefficients after orthogonal transformation using one of quantization matrices Qia and Qib, and executes entropy encoding (Huffman encoding). The following description will be given with reference to FIGS. 32A to 32D and FIGS. 33A and 33B.

Figure 32C:
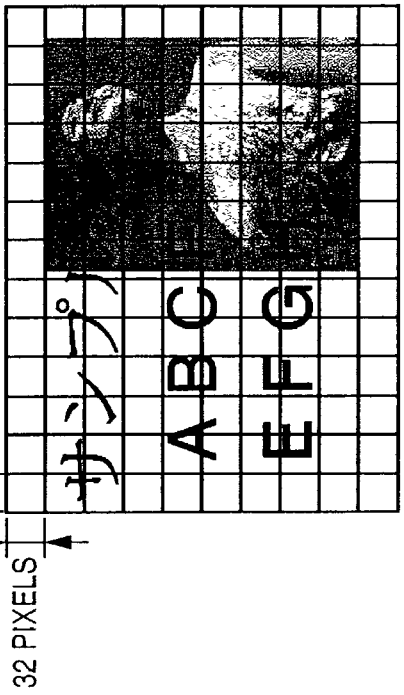
FIGS. 32A to 32D show the relationship among a document image, text region, and photo region in an embodiment.
Figure 32D:
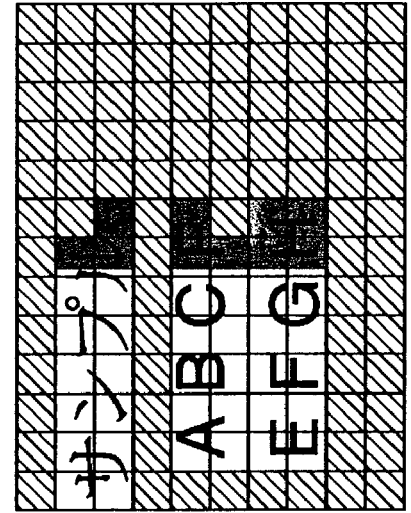
Figure 32A:

FIG. 32A shows a document image to be read, which includes both text and photo regions, as illustrated. In this embodiment, the encoding attribute discrimination unit 1513 determines an attribute that represents each 32×32 pixel block. More specifically, if a pixel block includes at least one pixel with a text attribute, it is determined that the pixel block corresponds to a text region. In other words, a photo region is determined when all pixels in a pixel block have attributes indicating the photo region (however, when a pixel block includes two or more pixels with text attributes, that pixel block may be determined as a text region, and the present invention is not limited to the number of pixels used in determination).

Figure 32B:
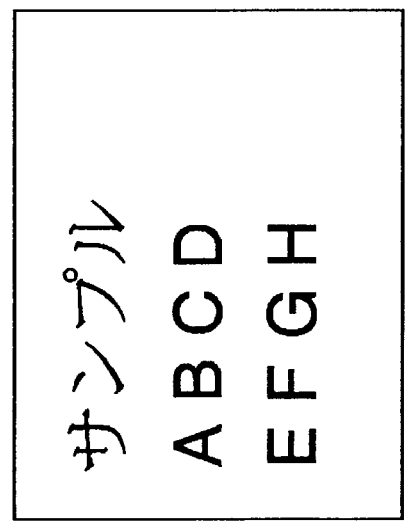

FIG. 32C shows only an extracted portion which is determined to be a text region in FIG. 32B. Conversely, FIG. 32D distinctively shows a portion, which is determined to be a photo region, by hatching.

As described above, since the legibility of characters is important for a text region, the quantization step for the text region (especially, middle and high frequency components) is preferably smaller than that for a photo region. In other words, even when a larger quantization step than the text region is set for the photo region, the influence on the entire region is small.

For example, FIGS. 33A and 33B show photo and text region quantization matrices corresponding to the quantization step parameter Q1. T1 is an example of a quantization matrix applied to a photo region that does not contain any characters, and T2 is an example of a quantization matrix applied to tiles including characters and line images.

In general, an upper left value in a matrix represents a quantization step for a DC component of DCT coefficients, and values represent quantization steps for higher-frequency components to the right or lower side. As a smaller numerical value is set, the quantization step is smaller, i.e., information of an original image is preserved more accurately. In matrix T2, numerical values in an upper left region are larger than those in matrix T1, and smaller numerical values are set to the right or lower side. That is, information of high-frequency components is preserved at the slight cost of low-frequency components, and compression deterioration of a text image can be reduced.

As a result, although the quantization step parameter changes to Q1, Q2, Q3, . . . every time the set data size is reached, the first memory 1504 stores encoded image data and encoded attribute flag data according to one quantization step parameter.

For example, when an image is printed by a printer (not shown) using encoded data stored in the first memory 1504, the encoded data (encoded image data and encoded attribute flag data) stored in the first memory 1504 are stored in a hard disk or the like as a file, and the encoded image data and encoded attribute flag data stored in the hard disk are read out, and are decoded and output in the following sequence.

Encoded attribute flag data for M×N pixels (32×32 pixels in this embodiment) of the attribute flag data which were stored after compression are read out and decoded.

A decoding parameter (dequantization matrix in the present invention) for encoded image data is switched in correspondence with the decoding result of the attribute flag data to decode the encoded image data, and the decoded data is output to an output buffer.

At this time, encoded attribute flag data are decoded, and the decoded attribute flag data of M×N pixels undergo analysis and discrimination processes equivalent to those in the encoding attribute discrimination unit 1513, thereby setting a dequantization matrix used to decode image data of corresponding M×N pixels. The discrimination results for a given tile upon encoding and decoding become equal to each other since the image scanner and page description language rendering unit have the same discrimination results, and the attribute flag data are compressed by reversible compression such as runlength encoding free from deterioration. Therefore, even when each tile is quantized using different quantization coefficients, dequantization coefficients suitable for each tile are set upon decoding, thus obtaining correctly decoded image data.

As described above, according to this embodiment, even when the setting value has been exceeded during the input process of image data, a compression encoding process can be done to obtain the target setting value or less without suspending the input process. Also, since two quantization matrices are used in accordance with attribute flag data, a relatively higher compression ratio of a photo region can be set compared to a case wherein only one matrix is used, and a process for suppressing deterioration of image quality can be done for a text region accordingly. Consequently, deterioration of image quality with respect to a compression ratio can be further suppressed compared to a case wherein only one matrix is used.

<Fifth Embodiment>

Figure 16:
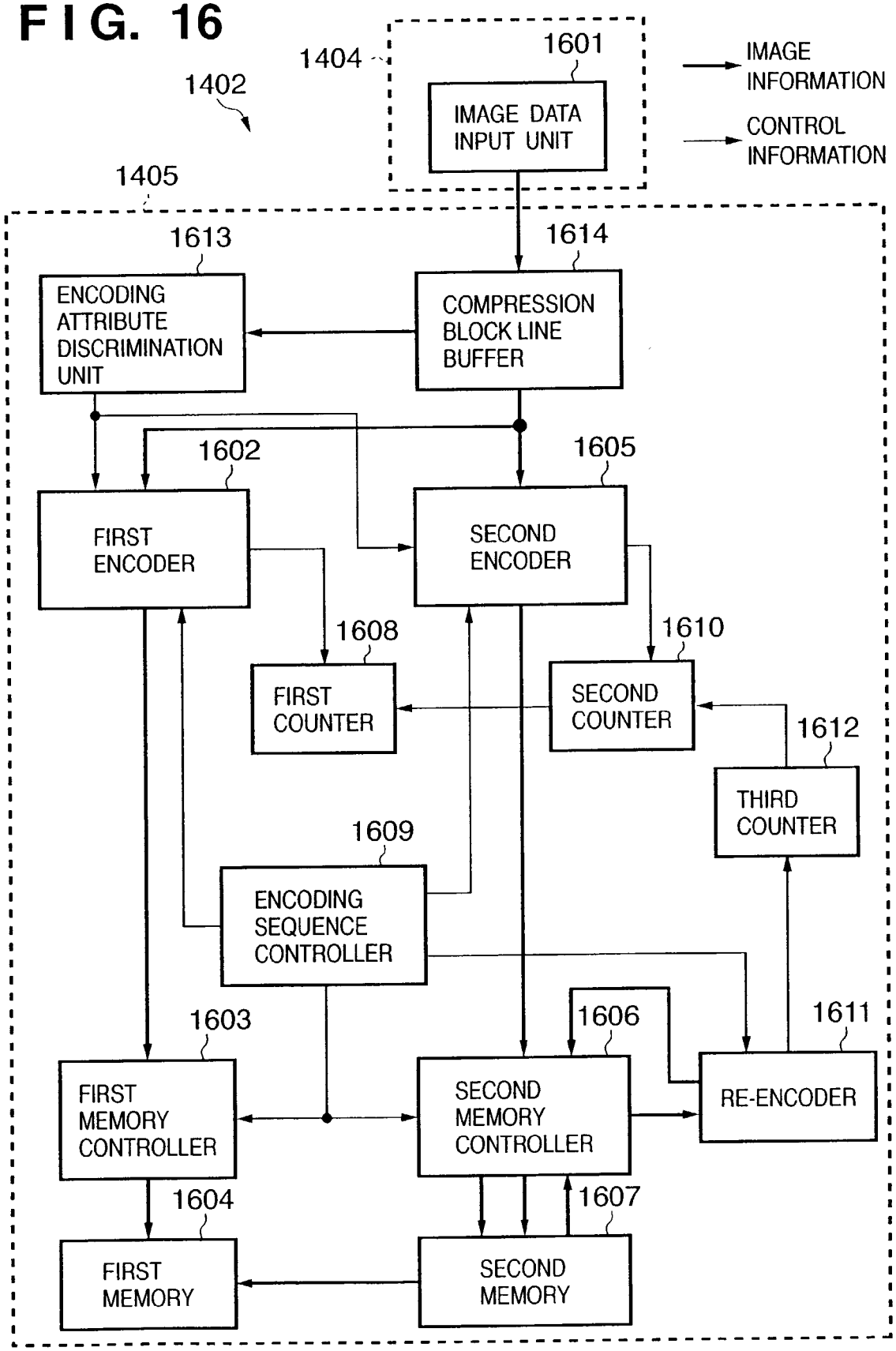
FIG. 16 is a block diagram showing an image processing apparatus according to the fifth embodiment of the present invention.

The fifth embodiment of the present invention will be described below. FIG. 16 shows the basic arrangement of an image processing apparatus.

A large difference from the image processing apparatus 1402 in FIG. 15 is that two encoders for executing a compression encoding process are parallelly arranged. The image processing apparatus 1402 parallelly executes compression encoding processes of image data input from an image data input unit 1601 using first and second encoders 1602 and 1605 to generate two different types of encoded data with different compression ratios. In this embodiment as well, an encoding method uses known JPEG encoding, the orthogonal transforms of image data corresponding to 8×8 pixels are computed to obtain transform coefficients, and the obtained transform coefficients then undergo quantization using a quantization step (to be described later) and a Huffman encoding process.

In this embodiment, the compression ratio of the second encoder 1605 is higher than that of the first encoder 1602. More specifically, in an initial state, a quantization step parameter Q1 is set in the first encoder 1602, and a quantization step parameter Q2 is set in the second encoder 1605. That is, the quantization step parameter that always assures a higher compression ratio than the first encoder 1602 by one rank is set in the second encoder 1605. The first and second encoders 1602 and 1605 select optimal quantization matrices to orthogonally transformed data in accordance with the set parameters and the discrimination result from an encoding attribute discrimination unit 1613, and quantize and encode the data.

A first counter 1608 counts the data size of encoded data output from the first encoder 1602, holds the count value, and also outputs the count value to an encoding sequence controller 1609.

On the other hand, encoded data that has undergone the compression encoding process by the second encoder 1605 is stored in a second memory 1607 via a second memory controller 1606. At this time, a second counter 1610 counts the data size of encoded data output from the second encoder 1605, and holds the count value.

Furthermore, upon transferring encoded data stored on the second memory 1607 to a first memory 1604, the count value is transferred to the first counter 1608 at the same time.

When the count value of the first counter 1608 has reached a given setting value while counting the data size of encoded data output from the first encoder 1602, the encoding sequence controller 1609 outputs a control signal to a first memory controller 1603 to discard the data already stored in the memory 1604 as in the fourth embodiment described above.

The encoding sequence controller 1609 outputs a control signal to the memory controllers 1606 and 1603 to read out encoded data (encoded image data and encoded attribute flag data) stored in the second memory 1607, to transfer the readout data to the first memory 1604, and to store them in the first memory 1604. As a result, the count value of the second counter 1610 is transferred to the first counter 1608, and is loaded (overwritten) as the count value of the first counter. Also, the second counter 1610 is cleared to zero, and begins to count the encoded data size of image data to be inputted subsequently.

That is, since the count value of the second counter 1610 represents the data size of encoded data stored in the second memory 1607, that count value and encoded data are respectively copied to the first counter and first memory so as to maintain their correspondence.

Furthermore, the encoding sequence controller 1609 outputs a control signal to the first and second encoders 1602 and 1605 to execute compression encoding processes which can further reduce the encoded data sizes.

For example, when it is determined first that the data size has exceeded the setting value, the quantization step parameters to be set in the first and second encoders 1602 and 1605 are respectively changed from Q1 and Q2 to Q2 and Q3. As a result, the first encoder 1602 takes over the quantization step parameter Q2 which was used in the second encoder 1605 so far, and the second encoder 1605 executes a compression encoding process with a higher compression ratio using a larger quantization step Q3 to prepare for the next overflow.

When it is determined first that the data size has exceeded the setting value, since the second memory 1607 stores encoded data that has undergone the compression encoding process according to the quantization step parameter Q2 used so far, this encoded data must be updated to that for the newly set quantization step parameter Q3. For this purpose, a re-encoder 1611 reads out encoded data (encoded image data and encoded attribute flag data) stored before it is determined that the data size has exceeded the setting value, decodes the readout data, executes a compression encoding process again using the newly set quantization step parameter Q3, and stores the encoded data in the second memory 1607 again via the second memory controller 1606. At this time, a third counter 1612 counts the encoded data size that have undergone the compression encoding process again in the re-encoder 1611. Upon completion of re-encoding of old encoded data, the third counter 1612 adds its count value to the second counter 1610. Therefore, upon completion of this addition, the count value of the second counter 1610 is equivalent to that obtained as if the second counter 1610 counted the encoded data size that has undergone the compression encoding process in the second encoder 1605 using the quantization step parameter Q3 from the head of input image data.

The two encoders 1602 and 1605 continue their compression encoding processes, as long as image data which are to undergo a compression encoding process from the image data input unit 1601 remain, independently of whether or not the re-encoding process is complete. Whether or not the count value of the first counter 1608 has reached the given setting value is repetitively monitored until the compression encoding process (encoding, re-encoding) of image data for one page input from the image data input unit 1601 is completed, and the aforementioned encoding and re-encoding processes are executed under the control based on this detection result.

Figure 26:
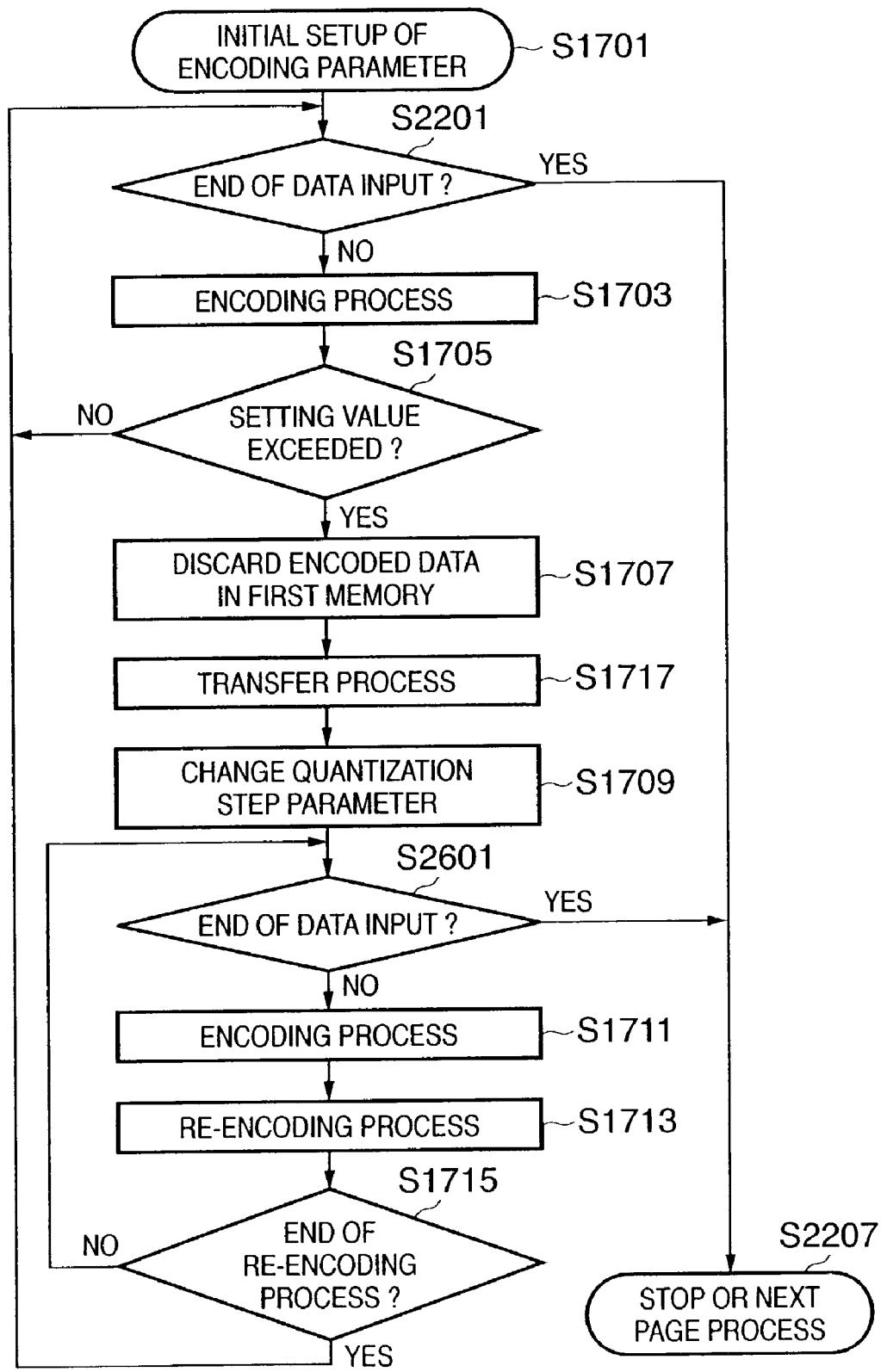
FIG. 26 is a flow chart showing the processing sequence in the arrangement shown in FIG. 16.

FIG. 26 is a flow chart showing the flow of processes in the arrangement shown in FIG. 16.

If there are two encoders, as described using FIG. 16, the compression encoding process of image data for one page is executed based on the flow chart shown in FIG. 26. Since a description of FIG. 26 is similar to that of FIG. 22 as the flow chart when one encoder is used for the most part, and the characteristic feature can be sufficiently understood for those who are skilled in the art from the above description, the processes will be explained in three phases as in the case wherein one encoder is used, and differences from FIG. 22 will be mainly described.

A large difference between the flow of FIG. 22 above and that of this embodiment is that the transfer process in step S1717 is moved between steps S1707 and S1709. That is, the encoding/re-encoding phase is counterchanged by the transfer phase (except for the encoded data discard process in step S1707).

In the initial setups of encoding parameters in step S1707, the quantization step parameters Q1 and Q2 are respectively set in the first and second encoders 1602 and 1605.

Figure 27:
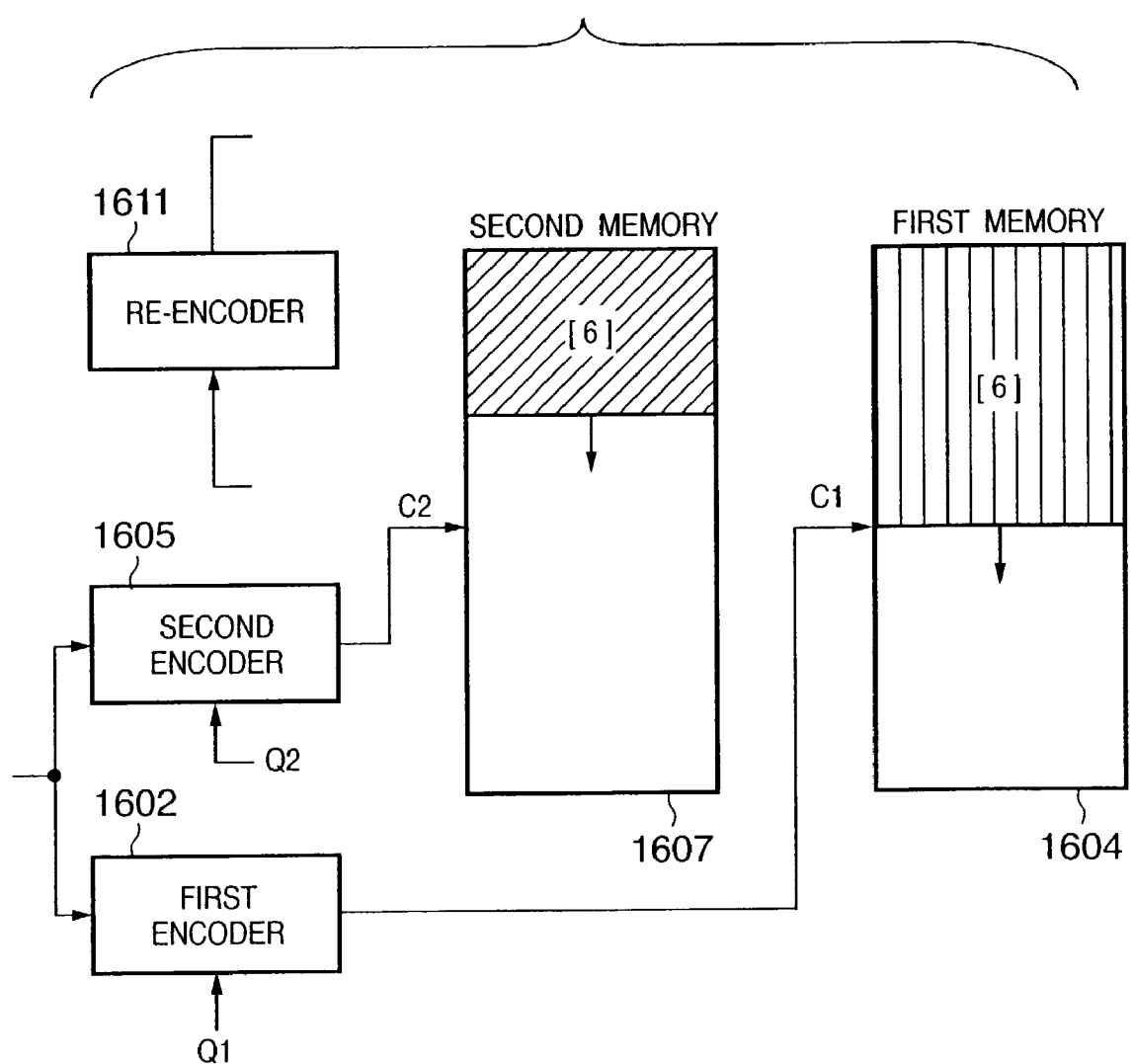
FIG. 27 shows the data flow and memory content in an encoding phase in an initial state in the arrangement shown in FIG. 16.

In the encoding phase, steps S2201, S1703, and S1705 are repeated. Steps S2201 and S1705 are the same processes as those when one encoder is used, but the compression encoding process in step S1703 is different, as shown in FIG. 27.

In order to increase the compression ratio of the encoded data to be stored in the first memory 1604 stepwise, encoded data that has undergone the compression encoding process using the quantization step parameter Q1 corresponding to the lowest compression ratio is stored first, and encoded data that has undergone the compression encoding process using the quantization step parameter Q2 that assures a compression ratio higher by one rank than Q1 is stored in the second memory 1607.

Figure 28:
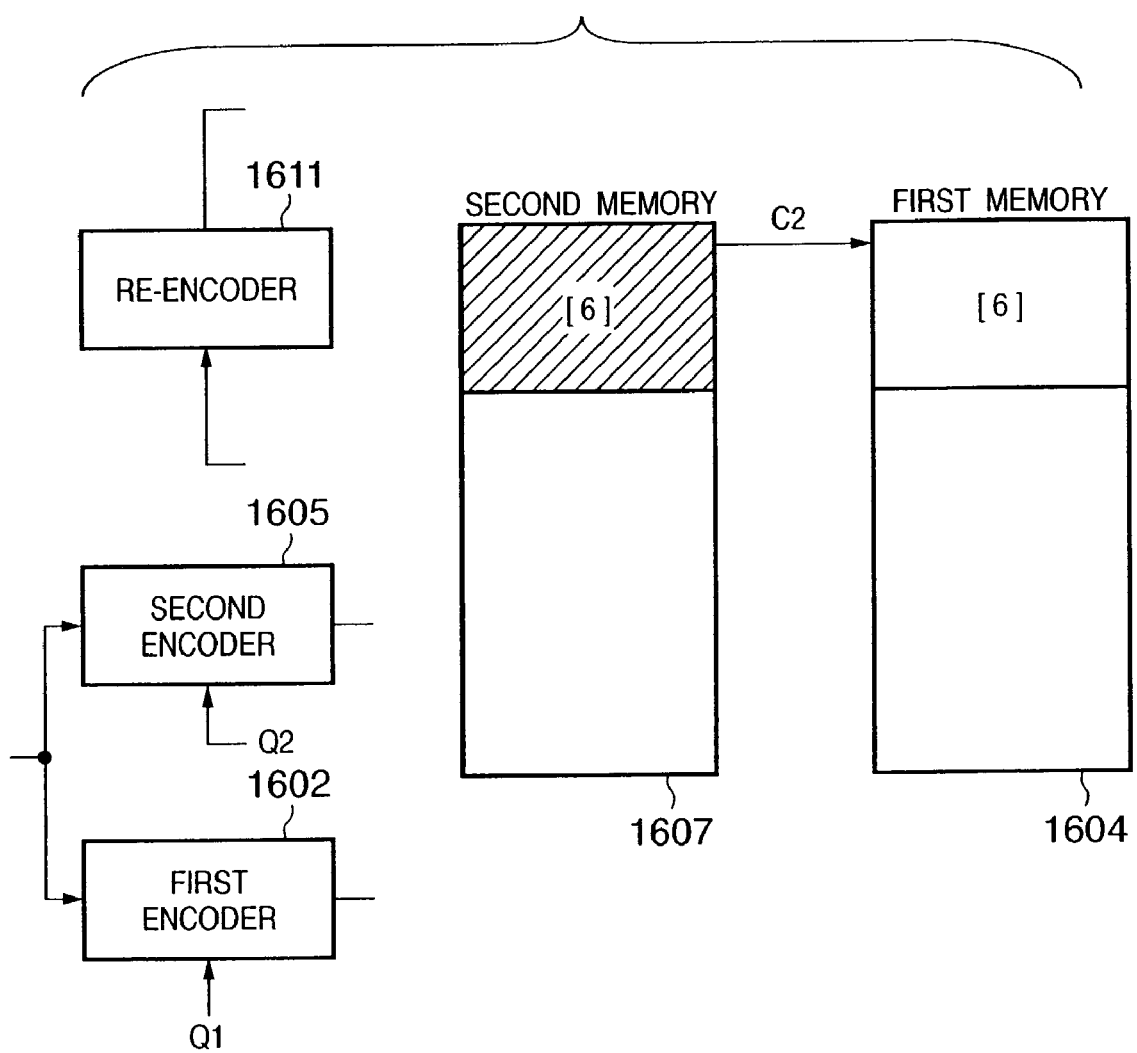
FIG. 28 shows the data flow and memory content in a transfer phase in the arrangement shown in FIG. 16.

If the encoded data size has exceeded the set upper limit value during storage in the first memory 1604 (step S1705), the encoded data held in the first memory 1604 is immediately discarded (step S1707), and the encoded data with a higher compression ratio held in the second memory 1607 is transferred to the first memory 1604 (step S1717, see FIG. 28). In this manner, appropriate encoded data as the second candidate, the data size of which does not exceed the upper limit value, can be quickly stored in the first memory 1607 without waiting for completion of the first re-encoding process described in the fourth embodiment (FIG. 15). This is the best merit of application of FIG. 16 having two encoders with respect to FIG. 15.

Since this embodiment has a concept that it is inefficient to store encoded data with the same compression ratio in the two memories 1604 and 1607, the second memory 1607 stores encoded data which has a higher compression ratio than that stored in the first memory 1604. Hence, the subsequent processes are executed based on this concept, and upon completion of the process for transferring encoded data in the second memory 1607 to the first memory 1604 (transfer phase), the encoded data in the second memory 1607 is re-encoded so that the second memory 1607 holds encoded data with a compression ratio higher by one level.

Figure 29:
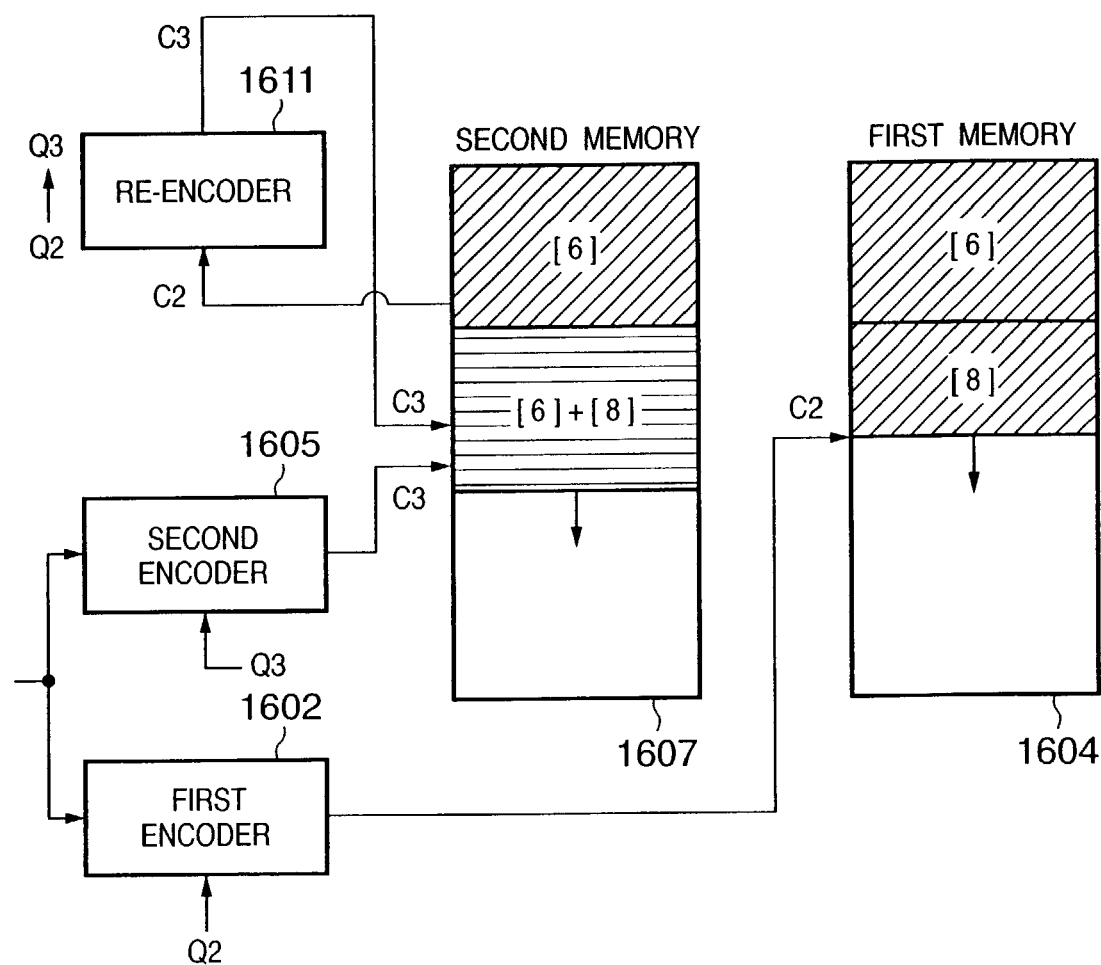
FIG. 29 shows the data flow and memory content in an encoding/re-encoding phase in the arrangement shown in FIG. 16.

More specifically, as shown in FIG. 29, in the encoding/re-encoding phase after the transfer phase, the quantization step parameters Q1 and Q2 to be applied to the two encoders 1602 and 1605 are respectively changed to Q2 and Q3 (step S1709). If the input process of image data for one page is not complete but continues (step S2203), the subsequent image data undergo compression encoding processes by the two encoders set with new quantization steps (step S1717), and are stored in the corresponding memories 1604 and 1607. Parallel to the compression encoding processes, encoded data stored in the second memory (equal to that which has been transferred to the first memory 1604) undergoes a re-encoding process (step S1713) in the re-encoder 1611 to obtain data that has undergone the compression encoding process using the quantization step Q3, i.e., to be changed to encoded data with a compression ratio higher by one level than the encoded data in the first memory. The re-encoded data is re-stored in the second memory 1607.

In this embodiment as well, the re-encoding process is implemented in such a manner that quantization values obtained after encoded data are Huffman-decoded undergo a bit-shift process that can yield the same results as those obtained by dividing these values by $2^n$, and then undergo Huffman encoding again, as in the fourth embodiment. This method can assure a fast re-encoding process since the quantization step is changed by only bit shift, and neither an inverse orthogonal transformation process nor re-orthogonal orthogonal transformation process are done.

When there are two encoders as in this embodiment, encoded data and re-encoded data are stored together in the second memory 1607, as shown in FIG. 29. Therefore, it is required for the second memory 1607 to segment encoded data by given units, and to manage the data as files or packets. For this purpose, the same arrangement as in the modification in the fourth embodiment may be used.

Figure 30:
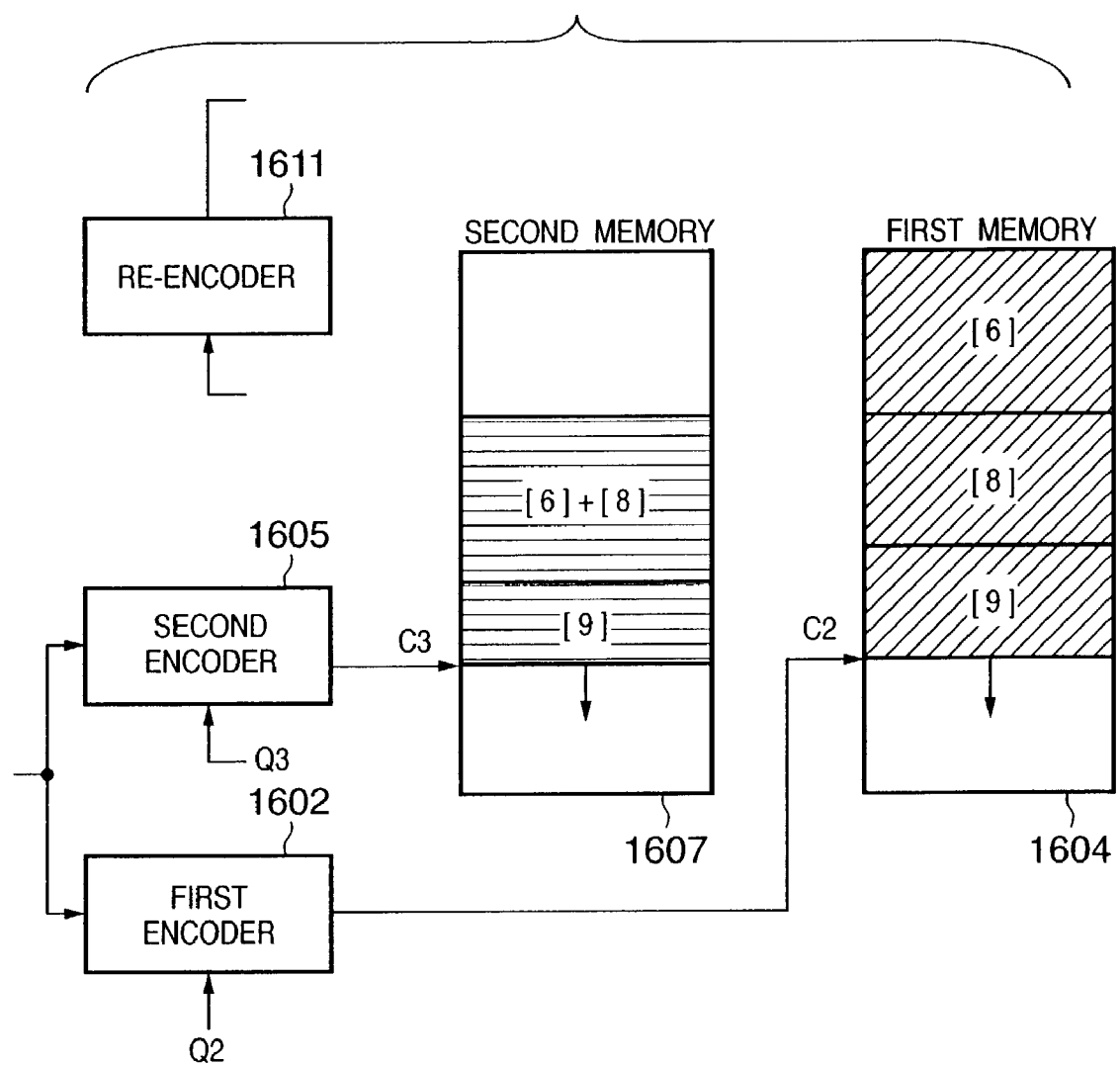
FIG. 30 shows the data flow and memory content in an encoding phase after the encoding/re-encoding phase in the arrangement shown in FIG. 16.

Referring to FIG. 26, if completion of the re-encoding process is detected in step S1715, the flow advances to the encoding phase (steps S2201 and S1703) again. In the encoding phase after the encoding/re-encoding phase, not only encoded data held in the two memories 1604 and 1607 have different compression ratios, but also the encoded data mix in considerably different ways (addresses), as shown in FIG. 30. Therefore, when the data size of data in the first memory 1604 has exceeded the setting value again, encoded data held in the second memory 1607 (that in an area of horizontal stripes [6]+[8]) must be transferred to the first memory 1604. In consideration of these situations, not only the second memory 1607 but also the first memory 1604 must manage encoded data as files or packets. Therefore, the first memory 1604 also requires the aforementioned management mechanism using the management table.

The state of the encoding phase shown in FIG. 30 is substantially the same as that in the encoding phase in the initial state (FIG. 27), except that the quantization step and the way encoded data mix are different before and after the re-encoding process. Hence, by repeating the encoding phase, transfer phase, and encoding-re-encoding phase, encoded data obtained by compressing image data for one page to the set upper limit value or less finally can be reliably stored in the first memory 1604.

Since the order of the transfer phase and encoding/re-encoding phase is reversed to that in the description of the fourth embodiment, detection of completion of the input process of image data for one page (step S2205), which is done after the transfer process in FIG. 22, is executed at substantially the same timing as detection of completion of the input process of image data for one page (step S2203), which is done in the encoding/re-encoding phase. The function of the two detection processes is the same as that of step S2205, and the timing thereof is the same as that of step S2203. Hence, these two steps are combined as a new step of detecting completion of the input process of image data for one page, and that step is described as step S2601.

In the description of the fourth and fifth embodiments, the first and second memories are physically independent ones. Such arrangement is advantageous since the two memories can be independently accessed, and this forms a characteristic feature of the present invention. However, the scope of the present invention includes a case wherein the first and second memories are not physically independent ones. When the description given so far is read back while two areas corresponding to the first and second memories are assured on one physical memory, and the first and second memories are respectively restated as first and second memory areas, the present invention can be implemented by one memory.

Upon implementing the above embodiments using one memory, some steps of the data transfer process described in the transfer phase can be omitted. Although a detailed description of such processes will be omitted since they are easily imaginable, when the two areas are strictly independently used, the same data transfer process as those for the two physical memories is required, but if identical data is shared between the two areas, not only the data transfer process can be omitted, but also the storage capacity can be reduced.

For example, upon transferring encoded data held in the second memory area to the first memory area, the same effect as that obtained upon actually transferring the encoded data can be obtained by transferring two pieces of information, i.e., the start address where the encoded data is stored, and the data size from the second memory controller to the first memory controller.

When the encoded data is stored in the file or packet format, the number of pieces of information transferred between the memory controllers slightly increases, i.e., management table information associated with that encoded data must be transferred. Even then, higher efficiency can be assured compared to transfer of the encoded data.

According to the aforementioned image processing apparatus, even when a target size is exceeded during a compression encoding process of input image data, the process can be continued to obtain the target size or less without suspending the input process of image data. In addition, since the fourth and fifth embodiments do not uniformly set an identical quantization step for a given quantization step parameter, but encode using quantization matrices respectively optimal to text and photo regions, a high compression ratio and minimum deterioration of image quality can be attained.

In the description of the above embodiments, compressed attribute flag data are respectively stored in the first and second memories. However, since attribute flag data as the discrimination result of the encoding attribute discrimination unit 1513 or 1613 remain the same for image data for one page, they may be stored in a shared memory (e.g., the first memory), and the re-encoder 1509 or 1611 may re-encode with reference to that shared memory.

In the description of the above embodiments, image data is inputted from the image scanner. However, the present invention may be applied to a printer driver that runs on a host computer. When the present invention is applied to the printer driver, since it can be determined upon receiving image data to be printed received from a host process (application or the like) if that image data is a natural image such as a photo or the like, or a non-natural image such as text, line images, or the like, the arrangement required for an image region separation process can be omitted, or the aforementioned processes can be more simplified.

The present invention can be applied to a combination of a computer program and appropriate hardware (encoding circuit and the like).

<Another Embodiment>

In each of the above embodiments, the integrated image processing apparatus, as shown in FIG. 11, has been explained. However, the present invention may be applied to either a system constituted by a plurality of devices (e.g., a host computer, interface device, reader, printer, and the like), or an apparatus consisting of a single equipment (e.g., a copying machine, facsimile apparatus, or the like).

The encoding and decoding methods of the present invention can be distributed as encode software and decode software. For this reason, the objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

Figure 6:
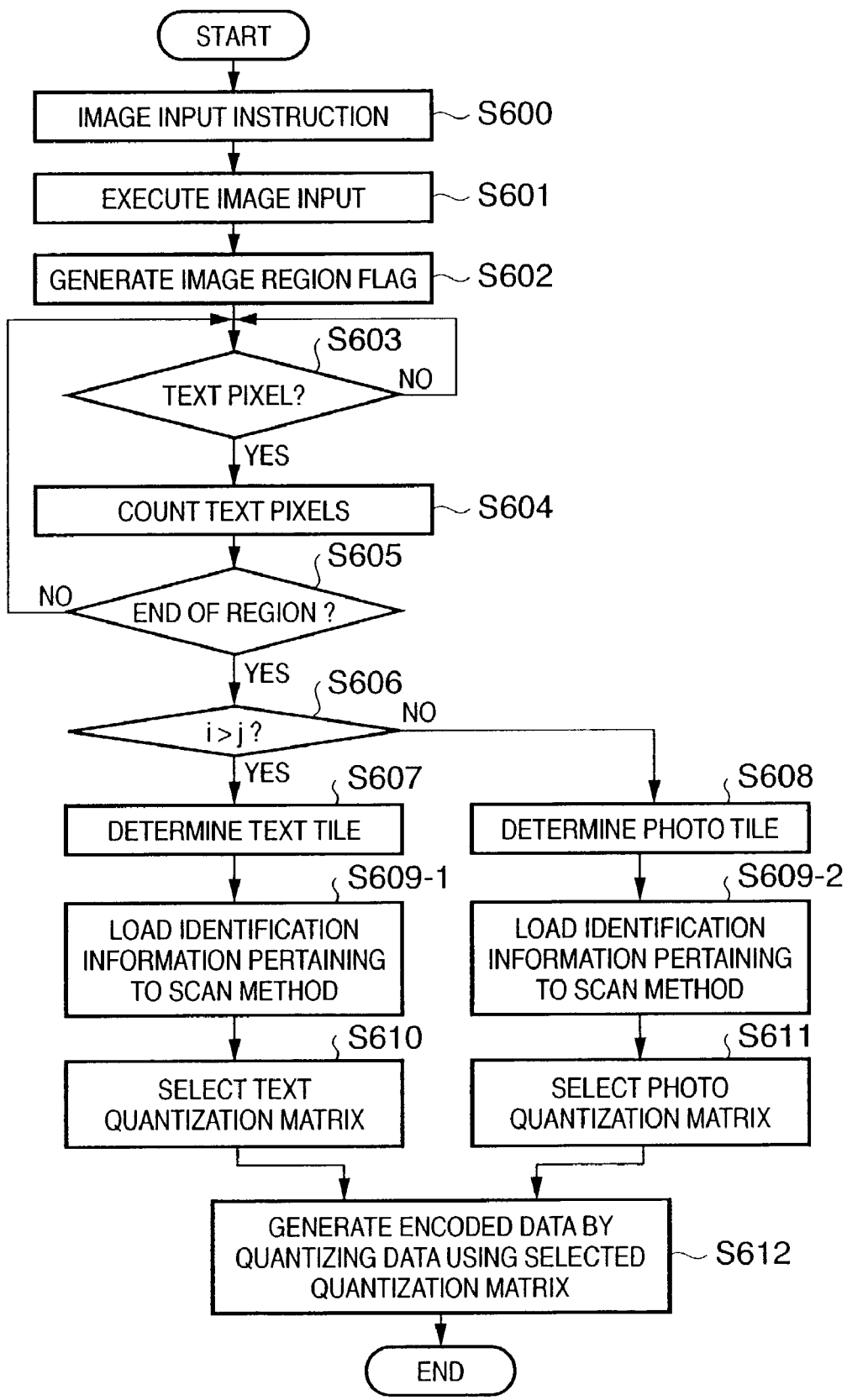
FIG. 6 is a flow chart showing the process in the image processing apparatus according to the first embodiment of the present invention.

When the present invention is applied to the storage medium, that storage medium stores program codes corresponding to the flow charts shown in FIG. 6 and the like.

As described above, according to the present invention, the need for an image re-input process can be obviated, encoded data, the size of which can fall within the set size, can be effectively generated, and deterioration of image quality can be minimized with respect to a compression ratio.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:
    input means for inputting image data;
    first discrimination means for discriminating a type of image of each of a plurality of regions, which form image data input by said input means;
    second discrimination means for discriminating if the image data is inputted by a continuous scan of images;
    selection means for selecting an encoding method used in compression of each region on the basis of discrimination results of said first and second discrimination means; and
    compression means for compressing image data of each region using the encoding method selected by said selection means, wherein said selection means selects a first encoding method if the type of image is a first type, regardless of whether or not the image data is inputted by the continuous scan of images, wherein said selection means selects a second encoding method if the type of image is a second type and the image data is inputted by a single scan of images, wherein said selection means selects a third encoding method if the type of image is the second type and the image data is inputted by the continuous scan of images, and wherein a compression ratio of the first encoding method is higher than a compression ratio of the second and third encoding methods and the compression ratio of the third encoding method is higher than the compression ratio of the second encoding method.

2. The apparatus according to claim 1, wherein the first type is a natural image and the second type is a non-natural image.

3. The apparatus according to claim 2, wherein the non-natural image is an artificial image represented by text, a thin line, a print halftone dot screen, or computer graphics, and the natural image is a photo image region.

4. The apparatus according to claim 2, wherein each region is a unit of encoding, which consists of a plurality of pixels, said first discrimination means discriminates one of a plurality of types of images to which each of the plurality of pixels that form the region belongs, executes a statistical process of the pixels for each region, and discriminates a type of image to which the region belongs on the basis of a statistical value obtained by the statistical process.

5. The apparatus according to claim 4, wherein information that pertains to the type of image of each region is attribute information for each region, which indicates a type to which that region belongs.

6. The apparatus according to claim 4, wherein information that pertains to the type of image of each region is attribute information for each pixel, which indicates a type to which that pixel belongs.

7. The apparatus according to claim 4, wherein information that pertains to the type of image of each region is code information which indicates the encoding method selected by said selection means.

8. The apparatus according to claim 4, wherein the statistical process calculates the numbers of pixels that belong to respective types of the plurality of pixels which form the region, and
when the number of pixels which belong to a predetermined type exceeds a predetermined threshold value, said first discrimination means determines that the region is a region of that predetermined type.

9. The apparatus according to claim 1, wherein the selection of an encoding method is a selection of encoding coefficients used upon compressing the image data.

10. The apparatus according to claim 9, wherein the encoding coefficients are a quantization matrix used upon compressing the image data.

11. The apparatus according to claim 1, wherein said compression means is first compression means, and further comprising second compression means for compressing information that pertains to the type of image of each region and forming means for forming a data structure which includes at least first compressed data obtained by said first compression means, and second compressed data obtained by said second compression means.

12. The apparatus according to claim 11, wherein said forming means inserts the second compressed data obtained by said second compression means in a header field of the first compressed data obtained by said compression means.

13. The apparatus according to claim 1, wherein said input means can input image data which is continuously read by an automatic reader that can automatically read a document to be read.

14. The apparatus according to claim 1, wherein said second discrimination means discriminates to see if an automatic reader is used.

15. The apparatus according to claim 1, wherein said second discrimination means discriminates based on the number of images that have been continuously read.

16. The apparatus according to claim 1, wherein said second discrimination means discriminates by comparing the number of images that have been continuously read with storage means for storing the image data.

17. The apparatus according to claim 2, wherein said input means comprises a page description language rendering unit for generating image data by interpreting a page description language command described in a page description language, and
said first discrimination means discriminates based on the page description language command interpreted by said page description language rendering unit if each region is a non-natural image region.

18. The apparatus according to claim 17, wherein said first discrimination means determines a region formed of character pixels, vector pixels, or graphic pixels to be the non-natural image region on the basis of the type of page description language command.

19. The apparatus according to claim 1, wherein said compression means is first compression means, and further comprising second compression means for compressing information that pertains to the type of image of each region, wherein said first compression means compresses the region using discrete cosine transformation, and
said second compression means compresses the information that pertains to the type of region using runlength encoding.

20. The apparatus according to claim 11, further comprising transmission means for transmitting the data structure formed by said forming means.

21. The apparatus according to claim 20, wherein said transmission means is an interface used to connect a wireless or wired line.

22. An image processing method comprising:
an input step of inputting image data;
a first discrimination step of discriminating a type of image of each of a plurality of regions, which form image data input in said input step;
a second discrimination step of discriminating if the image data is inputted by a continuous scan of images;
a selection step of selecting an encoding method used in compression of each region on the basis of discrimination results in said first and second discrimination steps; and
a compression step of compressing image data of each region using the encoding method selected in said selection step,
wherein a first encoding method is selected in said selection step if the type of image is a first type, regardless of whether or not the image data is inputted by the continuous scan of images,
wherein a second encoding method is selected in said selection step if the type of image is a second type and the image data is inputted by a single scan of images, wherein a third encoding method is selected in said selection step if the type of image is the second type and the image data is inputted by the continuous scan of images, and wherein a compression ratio of the first encoding method is higher than a compression ratio of the second and third encoding methods and the compression ratio of the third encoding method is higher than the compression ratio of the second encoding method.

23. A computer readable storage medium storing a computer program for making a computer implement an image processing method of claim 22.

* * * * *

UNITED STATES PATENT AND TRADEMARK OFFICE
CERTIFICATE OF CORRECTION

PATENT NO. : 7,194,140 B2
APPLICATION NO. : 10/286776
DATED : March 20, 2007
INVENTOR(S) : Naoki Ito et al.

It is certified that error appears in the above-identified patent and that said Letters Patent is hereby corrected as shown below:

ON COVER PAGE AT (56) FOREIGN PATENT DOCUMENTS

"JP 07030732   A   *   1/1995" should read --JP   7-030732   A   *   1/1995--.

ON COVER PAGE AT (57) ABSTRACT

Line 6, "includes first" should read --includes a first--;
Line 8, "input, second" should read --input, a second--;
Line 10, "images, selection" should read --images, a selection--;
Line 13, "unit, first" should read --units, a first--; and
Line 15, "and second" should read --and a second--.

COLUMN 4

Line 65, "transferphase" should read --transfer phase--.

COLUMN 5

Line 20, "a" should be deleted; and
Line 32, "comprises" should read --comprise--.

COLUMN 11

Line 38, "of32 x 32" should read --of 32 x 32--; and
Line 50, "(step S603)" should read --(step S603).--.

COLUMN 13

Line 65, "matrixes" should read --matrices--.

COLUMN 16

Line 21, "not" should be deleted; and
Line 57, "tile contained" should read --tile is contained--.

COLUMN 20

Line 32, "output" should read --outputs--.

UNITED STATES PATENT AND TRADEMARK OFFICE
CERTIFICATE OF CORRECTION

| | | |
|---|---|---|
| PATENT NO. | : 7,194,140 B2 | Page 2 of 2 |
| APPLICATION NO. | : 10/286776 | |
| DATED | : March 20, 2007 | |
| INVENTOR(S) | : Naoki Ito et al. | |

It is certified that error appears in the above-identified patent and that said Letters Patent is hereby corrected as shown below:

<u>COLUMN 30</u>

Line 51, "encoding-re-encoding" should read --encoding/re-encoding--.

Signed and Sealed this

Fifth Day of August, 2008

JON W. DUDAS
*Director of the United States Patent and Trademark Office*